(12) United States Patent
Iwakawa

(10) Patent No.: US 8,296,447 B2
(45) Date of Patent: Oct. 23, 2012

(54) METHOD FOR COPYING SESSION INFORMATION, CALL CONTROL SERVER FOR EXECUTING THE SAME, AND COMPUTER PRODUCT

(75) Inventor: Akinori Iwakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 129 days.

(21) Appl. No.: 12/405,841

(22) Filed: Mar. 17, 2009

(65) Prior Publication Data

US 2009/0240803 A1    Sep. 24, 2009

(30) Foreign Application Priority Data

Mar. 24, 2008   (JP) ................................ 2008-076330

(51) Int. Cl.
*G06F 15/16* (2006.01)
(52) U.S. Cl. ......... 709/228; 709/200; 709/224; 714/799
(58) Field of Classification Search .................. 709/200, 709/224, 228; 714/799
See application file for complete search history.

(56) References Cited

U.S. PATENT DOCUMENTS

| | | | |
|---|---|---|---|
| 7,068,763 B2 * | 6/2006 | Burrell et al. ............... | 379/88.13 |
| 7,272,651 B1 * | 9/2007 | Bolding et al. ............... | 709/227 |
| 7,661,027 B2 * | 2/2010 | Langen et al. ................... | 714/15 |
| 7,668,839 B2 * | 2/2010 | Otokawa et al. .......... | 707/999.01 |
| 7,711,848 B2 * | 5/2010 | Maes ........................... | 709/239 |
| 7,720,208 B1 * | 5/2010 | Kia et al. ................. | 379/144.01 |
| 7,805,517 B2 * | 9/2010 | Shim et al. ..................... | 709/227 |
| 2001/0032270 A1 * | 10/2001 | Koo ............................. | 709/237 |
| 2002/0156903 A1 * | 10/2002 | Bach Corneliussen ....... | 709/228 |
| 2004/0267939 A1 * | 12/2004 | Yumoto et al. ................ | 709/227 |
| 2005/0076099 A1 * | 4/2005 | Wang et al. ................... | 709/219 |
| 2005/0286503 A1 * | 12/2005 | Oda et al. ...................... | 370/355 |
| 2006/0013148 A1 * | 1/2006 | Burman et al. ................ | 370/252 |
| 2006/0123121 A1 | 6/2006 | Maegawa et al. | |
| 2006/0294241 A1 * | 12/2006 | Cherian et al. ................ | 709/227 |
| 2007/0027896 A1 * | 2/2007 | Newport et al. .............. | 707/102 |
| 2007/0174660 A1 * | 7/2007 | Peddada ........................... | 714/4 |
| 2007/0280447 A1 * | 12/2007 | Cai et al. .................. | 379/114.03 |
| 2007/0291786 A1 * | 12/2007 | Maes ............................ | 370/465 |
| 2008/0003964 A1 * | 1/2008 | Alperin et al. ............. | 455/185.1 |
| 2008/0059565 A1 * | 3/2008 | Turner et al. .................. | 709/203 |
| 2008/0137531 A1 * | 6/2008 | Tal-Aviv et al. .............. | 370/221 |
| 2008/0195738 A1 * | 8/2008 | Luo ................................ | 709/227 |
| 2008/0219445 A1 * | 9/2008 | Yato et al. ..................... | 380/255 |

(Continued)

FOREIGN PATENT DOCUMENTS

JP    2006-146663    6/2006

(Continued)

*Primary Examiner* — John Follansbee
*Assistant Examiner* — Anthony Mejia
(74) *Attorney, Agent, or Firm* — Staas & Halsey LLP

(57) ABSTRACT

The method is executed by a call control server that establishes a media session for sending and receiving media data between a calling terminal and a called terminal. The method includes exchanging messages with calling terminal and called terminal for establishing the media session, generating a session information necessary for establishing the media session based on the messages exchanged with the calling terminal and/or the called terminal, monitoring a media information included in the messages, the media information containing a definition specifying a way of exchanging the media data, determining, based on the monitoring result, whether the media session has been established, and transferring the session information to at least one other call control server different from the call control server if the media session has been established.

16 Claims, 26 Drawing Sheets

U.S. PATENT DOCUMENTS

| | | |
|---|---|---|
| 2008/0228926 A1* | 9/2008 | Shiratzky et al. .............. 709/228 |
| 2008/0250097 A1* | 10/2008 | Angelini et al. .............. 709/202 |
| 2009/0055473 A1* | 2/2009 | Synnergren .................. 709/204 |
| 2009/0323670 A1* | 12/2009 | Altberg et al. ................. 370/352 |
| 2009/0327516 A1* | 12/2009 | Amishima et al. ............ 709/238 |
| 2010/0023525 A1* | 1/2010 | Westerlund et al. ............ 707/10 |

FOREIGN PATENT DOCUMENTS

| | | |
|---|---|---|
| JP | 2007-4361 | 1/2007 |
| WO | 2005/017750 | 2/2005 |

* cited by examiner

FIG. 4

| SIP SERVER NAME | ADDRESS |
|---|---|
| SIP SERVER A | www.test.co.jp |
| SIP SERVER B | www.test2.co.jp |
| ⋮ | ⋮ |

FIG. 5A

HTTP GET (BROWSER A → SIP SERVER A)

GET http://www.test.co.jp/?caller=alice&callee=bob HTTP/1.1
Host: www.test.co.jp

FIG. 5B

INFO sip:sip.test.co.jp SIP/2.0
Via: SIP/2.0/TCP client1.test.co.jp:5060;branch=z9hG4bK74bf9
From: Alice <sip:alice@sip.test.co.jp>;tag=9fxced76sl
To: Server <sip:server@sip.test.co.jp>
Call-ID: 3848276298220188511@client1.test.co.jp
CSeq: 1 INFO
Content-Type: application/x-info
Content-Length: 44

<caller>alice</caller>
bob

FIG. 6

INVITE(i) (SIP SERVER A → IP PHONE A)

```
START LINE ← INVITE sip:alice@client1.test.co.jp SIP/2.0
              Via: SIP/2.0/TCP sip.test.co.jp:5060;branch=z9hG4bK74bf9
              Max-Forwards: 70
              From: Server <sip:server@sip.test.co.jp>;tag=9fxced76sl
HEADER        To: Alice <sip:alice@sip.test.co.jp>      SIP SESSION ID
              Call-ID: 1234@sip.test.co.jp  ← (SIP SERVER ↔ IP PHONE A)
              CSeq: 1 INVITE
              Contact: <sip:server@sip.test.co.jp;transport=tcp>
              Content-Type: application/sdp
              Content-Length: 151
NULL LINE ←                                             MEDIA INFORMATION
              v=0
              o=alice 2890844526 2890844526 IN IP4 sip.testu.co.jp
              s=-
BODY          c=IN IP4 0.0.0.0  ← C VALUE
              t=0 0
              m=audio 49172 RTP/AVP 0
              a=rtpmap:0 PCMU/8000
```

FIG. 7

200 OK(i) (IP PHONE A → SIP SERVER A)

SIP/2.0 200 OK
Via: SIP/2.0/TCP sip.test.co.jp:5060;branch=z9hG4bK74bf9
From: Server <sip:server@sip.test.co.jp>;tag=9fxced76sl
To: Alice <sip:alice@sip.test.co.jp>;tag=8321234356
Call-ID: 1234@sip.test.co.jp
CSeq: 1 INVITE
Contact: <sip:alice@client1.test.co.jp;transport=tcp>
Content-Type: application/sdp
Content-Length: 147 v=0
o=bob 2890844527 2890844527 IN IP4 client1.test.co.jp
s=-
c=IN IP4 10.254.214.60  ← C VALUE
t=0 0
m=audio 3456 RTP/AVP 0
a=rtpmap:0 PCMU/8000

FIG. 8

INVITE(ii) (SIP SERVER A → IP PHONE B)

```
INVITE sip:bob@client2.test.co.jp SIP/2.0
Via: SIP/2.0/TCP sip.test.co.jp:5060;branch=z9hG4bK74bf9
Max-Forwards: 70
From: Server <sip:server@sip.test.co.jp>;tag=9fxced76sl
To: Bob <sip:bob@sip.test.co.jp>
Call-ID: 5678@sip.test.co.jp      ← SIP SESSION ID
                                    (SIP SERVER A ↔ IP PHONE B)
CSeq: 1 INVITE
Contact: <sip:server@sip.test.co.jp;transport=tcp>
Content-Type: application/sdp
Content-Length: 151 v=0
o=alice 2890844526 2890844526 IN IP4 sip.test.co.jpclient1.test.co.jp
s=-
c=IN IP4 10.254.214.60      ← C VALUE
t=0 0
m=audio 3456 RTP/AVP 0
a=rtpmap:0 PCMU/8000
```

FIG. 9

200 OK(ii) (IP PHONE B → SIP SERVER A)

```
SP/2.0 200 OK
Via: SIP/2.0/TCP sip.test.co.jp:5060;branch=z9hG4bK74bf9
From: Server <sip:server@sip.test.co.jp>;tag=9fxced76sl
To: Bob <sip:bob@sip.test.co.jp>;tag=8321234356
Call-ID: 5678@sip.test.co.jp
CSeq: 1 INVITE
Contact: <sip:bob@client2.test.co.jp;transport=tcp>
Content-Type: application/sdp
Content-Length: 147 v=0
o=bob 2890844527 2890844527 IN IP4 client2.test.co.jp
s=-
c=IN IP4 10.254.214.130      ← C VALUE
t=0 0
m=audio 3458 RTP/AVP 0
a=rtpmap:0 PCMU/8000
```

FIG. 10

INVITE(iii) (SIP SERVER A → IP PHONE A)

```
INVITE sip:alice@client1.test.co.jp SIP/2.0
Via: SIP/2.0/TCP sip.test.co.jp:5060;branch=z9hG4bK74bf9
Max-Forwards: 70
From: Server <sip:server@sip.test.co.jp>;tag=9fxced76sl
To: Alice <sip:alice@sip.test.co.jp>
Call-ID: 1234@sip.test.co.jp
CSeq: 2 INVITE
Contact: <sip:server@sip.test.co.jp;transport=tcp>
Content-Type: application/sdp
Content-Length: 151 v=0
o=alice 2890844526 2890844526 IN IP4 sip.test.co.jp
s=-
c=IN IP4 10.254.214.130     ←—— C VALUE
t=0 0
m=audio 3458 RTP/AVP 0
a=rtpmap:0 PCMU/8000
```

FIG. 11

200 OK(iii) (IP PHONE A → SIP SERVER A)

```
SIP/2.0 200 OK
Via: SIP/2.0/TCP sip.test.co.jp:5060;branch=z9hG4bK74bf9
From: Server <sip:server@sip.test.co.jp>;tag=9fxced76sl
To: Alice <sip:alice@sip.test.co.jp>;tag=8321234356
Call-ID: 1234@sip.test.co.jp
CSeq: 2 INVITE
Contact: <sip:alice@client1.test.co.jp;transport=tcp>
Content-Type: application/sdp
Content-Length: 147 v=0
o=bob 2890844527 2890844527 IN IP4 client1.test.co.jp
s=-
c=IN IP4 10.254.214.60     ←—— C VALUE
t=0 0
m=audio 3456 RTP/AVP 0
a=rtpmap:0 PCMU/8000
```

FIG. 12

| CALL ID | SIP SESSION ID | TERMINAL NAME | ADDRESS | CONNECTION DESTINATION SIP SESSION ID | SESSION STATE | CALLER/CALLEE |
|---|---|---|---|---|---|---|
| 12345678 | 1234@sip.test.co.jp | IP PHONE A | alice@client1.test.co.jp | 5678@sip.test.co.jp | INITIAL | CALLER |
| | 5678@sip.test.co.jp | IP PHONE B | bob@client2.test.co.jp | 1234@sip.test.co.jp | INITIAL | CALLEE |

| CALL ID | | 12345678 | |
|---|---|---|---|
| TERMINAL NAME | | IP PHONE A (CALLER) | IP PHONE B (CALLEE) |
| SIP SESSION ID | | 1234@sip.test.co.jp | 5678@sip.test.co.jp |
| C VALUE | SIP SERVER SEND | 0.0.0.0 | — |
| | SIP SERVER RECEIVE | — | — |

(a2)

| CALL ID | | 12345678 | |
|---|---|---|---|
| TERMINAL NAME | | IP PHONE A (CALLER) | IP PHONE B (CALLEE) |
| SIP SESSION ID | | 1234@sip.test.co.jp | 5678@sip.test.co.jp |
| C VALUE | SIP SERVER SEND | 0.0.0.0 | — |
| | SIP SERVER RECEIVE | 10.254.214.60 | — |

(a3)

| CALL ID | | 12345678 | |
|---|---|---|---|
| TERMINAL NAME | | IP PHONE A (CALLER) | IP PHONE B (CALLEE) |
| SIP SESSION ID | | 1234@sip.test.co.jp | 5678@sip.test.co.jp |
| C VALUE | SIP SERVER SEND | 0.0.0.0 | 10.254.214.60 |
| | SIP SERVER RECEIVE | 10.254.214.60 | — |

(a4)

| CALL ID | | 12345678 | |
|---|---|---|---|
| TERMINAL NAME | | IP PHONE A (CALLER) | IP PHONE B (CALLEE) |
| SIP SESSION ID | | 1234@sip.test.co.jp | 5678@sip.test.co.jp |
| C VALUE | SIP SERVER SEND | 0.0.0.0 | 10.254.214.60 |
| | SIP SERVER RECEIVE | 10.254.214.60 | 10.254.214.130 |

(a5)

| CALL ID | | 12345678 | |
|---|---|---|---|
| TERMINAL NAME | | IP PHONE A (CALLER) | IP PHONE B (CALLEE) |
| SIP SESSION ID | | 1234@sip.test.co.jp | 5678@sip.test.co.jp |
| C VALUE | SIP SERVER SEND | 10.254.214.130 | 10.254.214.60 |
| | SIP SERVER RECEIVE | 10.254.214.60 | 10.254.214.130 |

GET http://www.test.co.jp/?caller=alice&callee=bob HTTP/1.1
Host: www.test.co.jp (1-3)

HTTP/1.1 200 OK
Content-Type:text/html

<html>
<a href="http://www.test.co.jp/go.html;sessionID=H1234">~</a>
</html>

HTTP SESSION ID

FIG. 18

| HTTP SESSION ID | CALL ID | MAIN SERVER | ALTERNATIVE SERVER |
|---|---|---|---|
| H1234 | 12345678 | SIP SERVER A | SIP SERVER B |

FIG. 22

| C VALUE |
|---|
| 10. 254. 214. 100 |
| 10. 254. 214. 110 |
| ⋮ |

FIG. 23

INVITE(ii) (SIP SERVER A → IP PHONE B)

INVITE sip:bob@client2.test.co.jp SIP/2.0
Via: S P/2.0/TCP sip.test.co.jp:5060;branch=z9hG4bK74bf9
Max-Forwards: 70
From: Server <sip:server@sip.test.co.jp>;tag=9fxced76sl
To: Bob <sip:bob@sip.test.co.jp>
Call-ID: 3848276298220188511@sip.test.co.jp
CSeq: 1 INVITE
Contact: <sip:server@sip.test.co.jp;transport=tcp>
Content-Type: application/sdp
Content-Length: 151 v=0
o=alice 2890844526 2890844526 IN IP4 client1.test.co.jp
s=-
c=IN IP4 10.254.214.100  ← C VALUE
t=0 0
m=audio 3456 RTP/AVP 0
a=rtpmap:0 PCMU/8000

FIG. 24

INVITE(iii) (SIP SERVER A → IP PHONE A)

INVITE sip:alice@client1.test.co.jp SIP/2.0
Via: SIP/2.0/TCP sip.test.co.jp:5060;branch=z9hG4bK74bf9
Max-Forwards: 70
From: Server <sip:server@sip.test.co.jp>;tag=9fxced76sl
To: Alice <sip:alice@sip.test.co.jp>
Call-ID: 3848276298220188511@sip.test.co.jp
CSeq: 2 INVITE
Contact: <sip:server@sip.test.co.jp;transport=tcp>
Content-Type: application/sdp
Content-Length: 151 v=0
o=alice 2890844526 2890844526 IN IP4 sip.test.co.jp
s=-
c=IN IP4 10.254.214.110  ← C VALUE
t=0 0
m=audio 3458 RTP/AVP 0
a=rtpmap:0 PCMU/8000

| CALL ID | | 12345678 | |
|---|---|---|---|
| TERMINAL NAME | | IP PHONE A (CALLER) | IP PHONE B (CALLEE) |
| SIP SESSION ID | | 1234@sip.test.co.jp | 5678@sip.test.co.jp |
| C VALUE | SIP SERVER SEND | 0.0.0.0 | — |
| | SIP SERVER RECEIVE | — | — |

(a2)

| CALL ID | | 12345678 | |
|---|---|---|---|
| TERMINAL NAME | | IP PHONE A (CALLER) | IP PHONE B (CALLEE) |
| SIP SESSION ID | | 1234@sip.test.co.jp | 5678@sip.test.co.jp |
| C VALUE | SIP SERVER SEND | 0.0.0.0 | — |
| | SIP SERVER RECEIVE | 10.254.214.60 | — |

(b1)

| CALL ID | | 12345678 | |
|---|---|---|---|
| TERMINAL NAME | | IP PHONE A (CALLER) | IP PHONE B (CALLEE) |
| SIP SESSION ID | | 1234@sip.test.co.jp | 5678@sip.test.co.jp |
| C VALUE | SIP SERVER SEND | 0.0.0.0 | 10.254.214.100 |
| | SIP SERVER RECEIVE | 10.254.214.60 | — |

(b2)

| CALL ID | | 12345678 | |
|---|---|---|---|
| TERMINAL NAME | | IP PHONE A (CALLER) | IP PHONE B (CALLEE) |
| SIP SESSION ID | | 1234@sip.test.co.jp | 5678@sip.test.co.jp |
| C VALUE | SIP SERVER SEND | 0.0.0.0 | 10.254.214.100 |
| | SIP SERVER RECEIVE | 10.254.214.60 | 10.254.214.130 |

(b3)

| CALL ID | | 12345678 | |
|---|---|---|---|
| TERMINAL NAME | | IP PHONE A (CALLER) | IP PHONE B (CALLEE) |
| SIP SESSION ID | | 1234@sip.test.co.jp | 5678@sip.test.co.jp |
| C VALUE | SIP SERVER SEND | 10.254.214.110 | 10.254.214.100 |
| | SIP SERVER RECEIVE | 10.254.214.60 | 10.254.214.130 |

| CALL ID | 12345678 | |
|---|---|---|
| TERMINAL NAME | IP PHONE A (CALLER) | IP PHONE B (CALLEE) |
| SIP SESSION ID | 1234@sip.test.co.jp | 5678@sip.test.co.jp |
| C VALUE — SIP SERVER SEND | 0.0.0.0/49172 | — |
| C VALUE — SIP SERVER RECEIVE | — | — |

(a2)

| CALL ID | 12345678 | |
|---|---|---|
| TERMINAL NAME | IP PHONE A (CALLER) | IP PHONE B (CALLEE) |
| SIP SESSION ID | 1234@sip.test.co.jp | 5678@sip.test.co.jp |
| C VALUE — SIP SERVER SEND | 0.0.0.0/49172 | — |
| C VALUE — SIP SERVER RECEIVE | 10.254.214.60/3456 | — |

(a3)

| CALL ID | 12345678 | |
|---|---|---|
| TERMINAL NAME | IP PHONE A (CALLER) | IP PHONE B (CALLEE) |
| SIP SESSION ID | 1234@sip.test.co.jp | 5678@sip.test.co.jp |
| C VALUE — SIP SERVER SEND | 0.0.0.0/49172 | 10.254.214.60/3456 |
| C VALUE — SIP SERVER RECEIVE | 10.254.214.60/3456 | — |

(a4)

| CALL ID | 12345678 | |
|---|---|---|
| TERMINAL NAME | IP PHONE A (CALLER) | IP PHONE B (CALLEE) |
| SIP SESSION ID | 1234@sip.test.co.jp | 5678@sip.test.co.jp |
| C VALUE — SIP SERVER SEND | 0.0.0.0/49172 | 10.254.214.60/3456 |
| C VALUE — SIP SERVER RECEIVE | 10.254.214.60/3456 | 10.254.214.130/3458 |

(a5)

| CALL ID | 12345678 | |
|---|---|---|
| TERMINAL NAME | IP PHONE A (CALLER) | IP PHONE B (CALLEE) |
| SIP SESSION ID | 1234@sip.test.co.jp | 5678@sip.test.co.jp |
| C VALUE — SIP SERVER SEND | 10.254.214.130/3458 | 10.254.214.60/3456 |
| C VALUE — SIP SERVER RECEIVE | 10.254.214.60/3456 | 10.254.214.130/3458 |

FIG. 28

| CALL ID | MAIN SERVER | ALTERNATIVE SERVER | ADDRESS OF IP PHONE A | ADDRESS OF IP PHONE B | CONNECTION STATUS |
|---|---|---|---|---|---|
| 12345678 | SIP SERVER A | SIP SERVER B | alice@client1.test.co.jp | bob@client2.test.co.jp | CONNECTION WAITING |
| 11111111 | SIP SERVER A | SIP SERVER B | ken@xxx.xxxx | mary@xxx.xxxx | CONNECTION COMPLETED |
| ... | ... | ... | ... | ... | ... |

METHOD FOR COPYING SESSION INFORMATION, CALL CONTROL SERVER FOR EXECUTING THE SAME, AND COMPUTER PRODUCT

CROSS-REFERENCE TO RELATED APPLICATIONS

This application is based upon and claims the benefit of priority of the prior Japanese Patent Application No. 2008-76330, filed on Mar. 24, 2008, the entire contents of which are incorporated herein by reference.

BACKGROUND

1. Field of the Invention

The present invention relates to a method for copying session information, a call control server for executing the method, and a program for copying session information.

2. Description of the Related Art

In information processing systems based on the World Wide Web (WWW), one service such as a ticket purchasing service is processed in response to a plurality of requests. In such systems, a function called session is used to clarify to which service processing status each request belongs. A server maintains session information. The session information includes information required for a service, including service processing statuses such as "reserved" and "paid", user identifiers (IDs), addresses, names, and session IDs. A client sends a request along with the ID of each session to the server. Thus, the server can recover a service processing status. For example, when a user terminates and then resumes a process in a browser, items already entered can be automatically recovered by identifying a service processing status based on a session ID at the time of termination. Further, a mismatch can also be prevented from occurring between the true and recovered service processing statuses.

In order to improve the reliability of a WWW server having such session functions, a mechanism in which a plurality of WWW servers share session information has been widely used. For example, Japanese Unexamined Patent Application Publication No. 2006-146663 discloses a mechanism in which all application servers that form a cluster have session information regarding each application server. If a fault occurs in one of the servers, another server that shares the session information takes over the process.

Additionally, a system for implementing telephone functions using an Internet Protocol (IP) technology, which WWW is based on, has recently become widely available. This system uses a protocol called Session Initiation Protocol (SIP), in which messages are sent and received between a SIP server, a calling terminal, and a called terminal to establish a media session between the calling terminal and the called terminal. The messages include session information. The session information is copied and shared by a plurality of SIP servers.

SUMMARY

A method for copying session information. The method is executed by a call control server that establishes a media session for sending and receiving media data between a calling terminal and a called terminal. The method includes a sending and receiving operation of sending and receiving messages to and from the calling terminal and the called terminal in a call control session for establishing the media session, a session information generating operation of generating session information that is required for executing the call control session, a monitoring operation of monitoring media information that defines a method of sending and receiving the media data, the media information being included in the messages, a copying determining operation of determining whether or not the media session has been established according to a monitoring result, and a copying processing operation of copying the session information and sending the copied session information to at least one other call control server different from the call control server when it is determined that the media session has been established.

A call control server that establishes a media session for sending and receiving media data between a calling terminal and a called terminal. The call control server includes a sending and receiving unit sending and receiving messages to and from the calling terminal and the called terminal in a call control session for establishing the media session, a session information generating unit generating session information that is required for executing the call control session, a monitoring unit monitoring media information that defines a method of sending and receiving the media data, the media information being included in the messages, a copying determining unit determining whether or not the media session has been established according to a monitoring result, and a copying processing unit copying the session information and sending the copied session information to at least one other call control server different from the call control server when it is determined that the media session has been established.

BRIEF DESCRIPTION OF THE DRAWINGS

FIG. 4 is a diagram representing an example cluster configuration.

FIG. 5A is a diagram representing an example of description of an HTTP request based on the GET method.

FIG. 5B is a diagram representing an example of description of a call origination request based on the SIP INFO method.

FIG. 6 is a diagram representing an example of description of an INVITE (i) message.

FIG. 7 is a diagram representing an example of description of a 200 OK (i) message.

FIG. 8 is a diagram representing an example of description of an INVITE (ii) message.

FIG. 9 is a diagram representing an example of description of a 200 OK (ii) message.

FIG. 10 is a diagram representing an example of description of an INVITE (iii) message.

FIG. 11 is a diagram representing an example of description of a 200 OK (iii) message.

FIG. 12 is a table representing an example of session information generated by a call control unit in response to the HTTP request depicted in FIG. 5A.

FIG. 13 is an information table obtained at time points (a1) to (a5) depicted in FIG. 2.

FIG. 17 is a diagram representing an example of description of information included in packets.

FIG. 18 is a table representing an example of a session association table obtained at time point (c1) depicted in FIG. 16.

FIG. 22 is a table representing an example of a specific address table.

FIG. 23 is a diagram representing an example of description of an INVITE (ii) message according to the second modification.

FIG. 24 is a diagram representing an example of description of an INVITE (iii) message according to the second modification.

FIG. 25 is an information table obtained at time points (a1), (a2), and (b1) to (b3) depicted in FIG. 20.

FIG. 26 is an information table obtained at the time points (a1) to (a5) depicted in FIG. 2 according to a third modification.

FIG. 28 is a table representing an example of a connection-status table obtained at time point (d1) depicted in FIG. 27.

DETAILED DESCRIPTION OF THE EMBODIMENTS

Session information is updated when messages are sent and received. Thus, a plurality of SIP servers copy and share session information at all times at which messages are sent and received. In this manner, since the copying of session information is done each time a message is sent or received, a problem occurs in that the copying process is frequently performed and involves an increase in processing load. This problem is particularly serious in a call connection called inter-network calling because the following procedure may be performed: establishing a temporary session between terminals and a server, exchanging some messages, and then exchanging media data used for voice conversation between the terminals to start the voice conversation.

The present embodiment provides, in an aspect, a technique which can reduce a processing load involved in copying session information.

First Embodiment (1) Overall Structure

Figure 1:
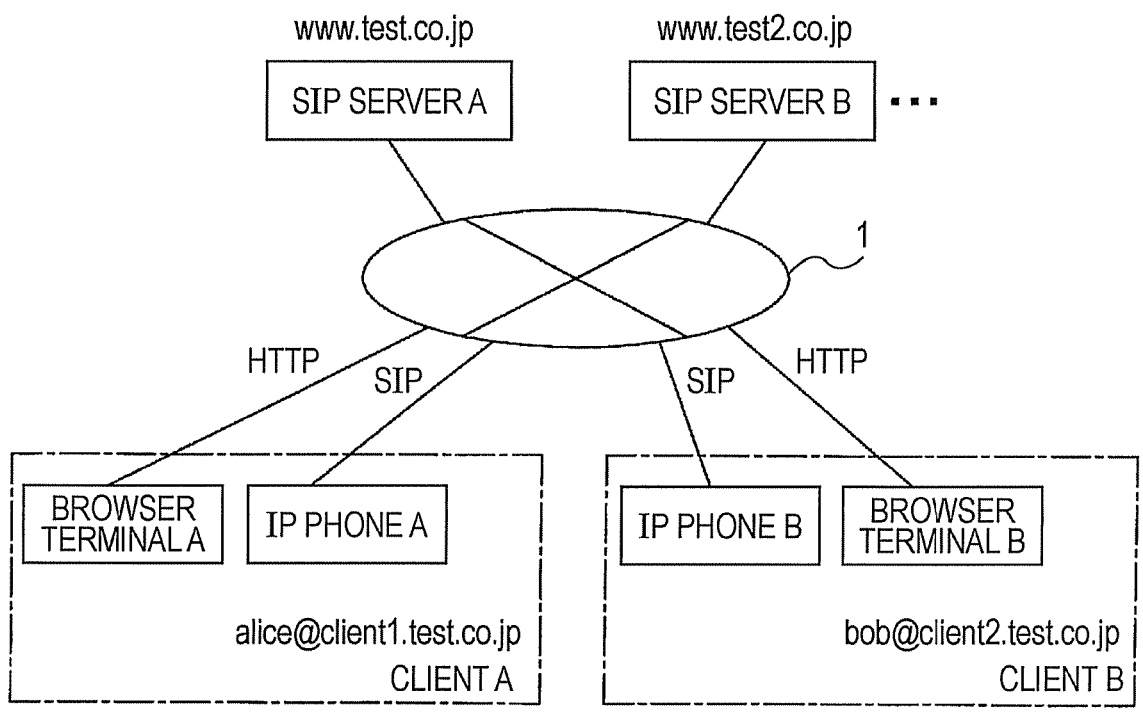
FIG. 1 is a network configuration diagram according to a first embodiment.

In the present embodiment, an inter-network calling service capable of originating calls from a browser terminal to an IP phone will be described by way of example. FIG. 1 is a network configuration diagram according to a first embodiment. A client A, which corresponds to a user A, includes a browser terminal A and an IP phone A (alice@client1.test.co.jp). A client B, which corresponds to a user B, includes a browser terminal B and an IP phone B (bob@client2.test.co.jp). The term "browser terminal" refers to a terminal on which application software for browsing Web pages, such as a Web browser, is installed. The term "IP phone" refers to a phone which allows voice conversations to be transmitted over the Internet. As depicted in FIG. 1, a SIP server A (www.test.co.jp), a SIP server B (www.test2.co.jp), the browser terminal A, the IP phone A, the browser terminal B, and the IP phone B are connected to one another via the Internet 1. In the following description, the SIP server A is a main server that first performs a call control session. The SIP server B is a server that, together with the SIP server A, forms a cluster. In the following description, the SIP server B is an alternative server that takes over the call control session from the SIP server A when the SIP server A can no longer continue the call control session.

SIP is a protocol for performing call control sessions including setup of a media session for sending and receiving media data such as audio, video, and text between a calling terminal and a called terminal, and termination of the media session. A SIP server is a server that performs the call control sessions as described above between a calling terminal and a called terminal. During the call control sessions, the SIP server obtains session information required for various processes, such as the addresses of the calling terminal and the called terminal. The session information is copied and shared between a plurality of SIP servers.

In the present embodiment, a call originating from the client A to the client B will be described by way of example. A call originates from the client A to the client B as follows: First, the user A enters a given address on a screen of the browser terminal A to start an inter-network calling service. Then, the user A enters the phone number of the IP phone A and the phone number of the IP phone B of the user B or a partner on a given screen of the inter-network calling service, and originates a call. In response to the call originating from the client A, the SIP server A performs a call control session.

(2) Overview of Call Control Session

Figure 2:
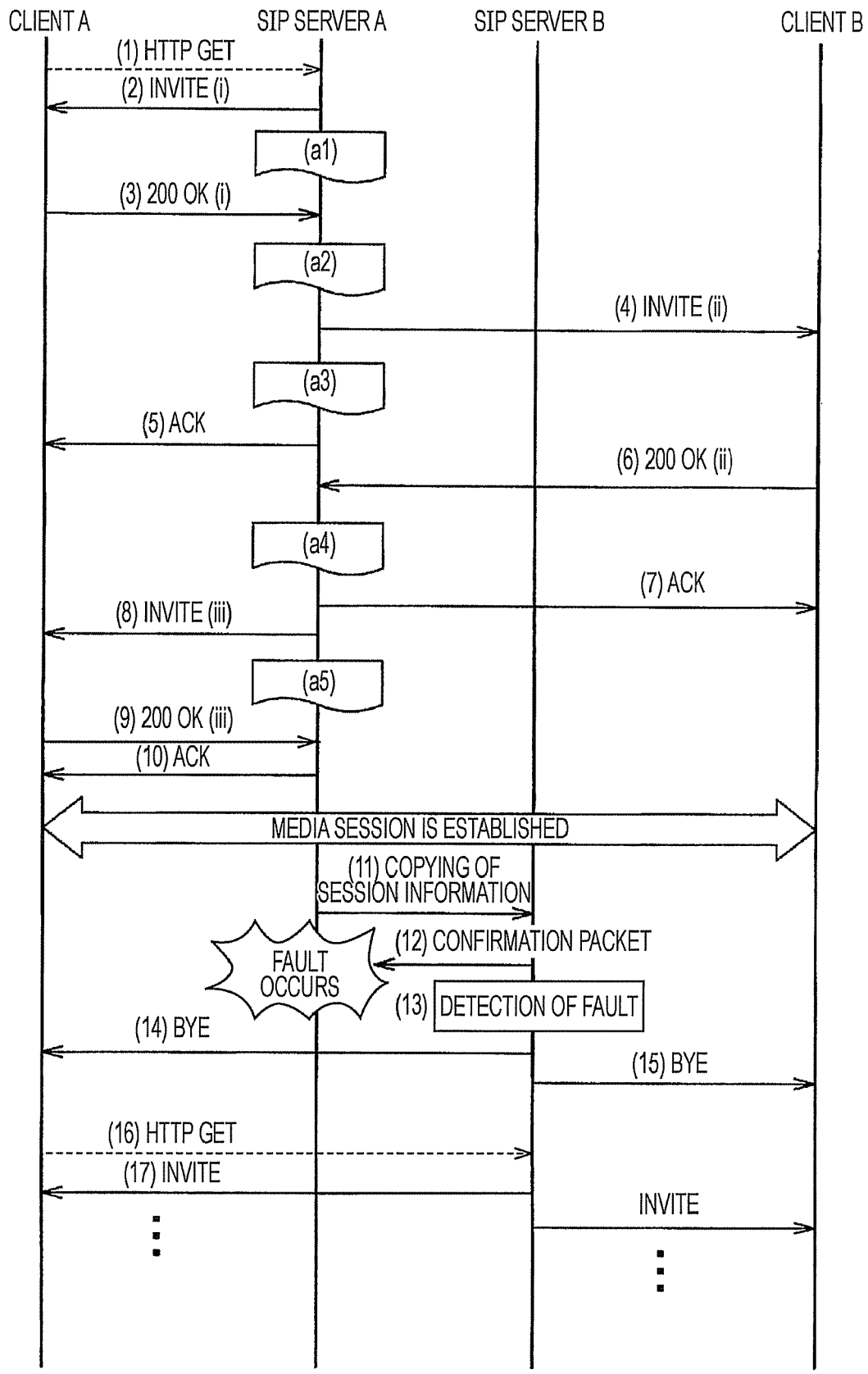
FIG. 2 is a chart representing an example of a flow including a call control session according to the first embodiment.

FIG. 2 illustrates an example of a flow including a call control session according to the first embodiment. In response to a request from the user A, the browser terminal A of the client A sends a call origination request, which may be a hypertext transfer protocol (HTTP) request based on the GET method, to the SIP server A (see process (1)). Thus, a SIP server also functions as an HTTP server. Since the request is sent via HTTP, a session set up by the request is hereinafter referred to as an "HTTP session" to distinguish it from SIP-based call control sessions described below. Note that the method by which a call origination request is forwarded to a SIP server is not limited to HTTP, and may be realized by, for example, a notification based on the SIP INFO method.

Upon receipt of the HTTP request from the browser terminal A, the SIP server A performs SIP-based call control sessions to establish a media session between the IP phones A and B. First, the SIP server A sends an INVITE (i) message to the IP phone A of the client A serving as a calling terminal (see process (2)). In response to the INVITE (i) message, the IP phone A sends a 200 OK (i) message, and the SIP server A sends an ACK message to the IP phone A (see processes (3) and (5)). Upon receipt of the 200 OK (i) message from the IP phone A, the SIP server A further sends an INVITE (ii) message to the IP phone B which is the partner specified by the HTTP request (see process (4)). In response to the INVITE (ii) message, the IP phone B sends a 200 OK (ii) message, and the SIP server A sends an ACK message to the IP phone B (see processes (6) and (7)). Upon receipt of the 200 OK (ii) message from the IP phone B, the SIP server A sends an INVITE (iii) message to the IP phone A (see process (8)). In response to the INVITE (iii) message, the IP phone A sends a 200 OK (iii) message, and the SIP server A sends an ACK message to the IP phone A (see processes (9) and (10)). A media session is established by the call control sessions described above.

When the media session is established, the SIP server A copies the session information obtained in the call control sessions, and sends the copied session information to the SIP server B that, together with the SIP server A, forms a cluster (see process (11)). Accordingly, the session information is shared between a plurality of SIP servers. The SIP server B regularly generates and sends a confirmation packet for detecting a fault that has occurred in the SIP server A, and detects a fault in the SIP server A on the basis of a response packet in response to the confirmation packet (see processes (12) and (13)).

Thereafter, in order to execute following call control such as call disconnect, transfer, or hold, the terminal A or B sends a call control message to the alternative server or the SIP server B because there is no response from the SIP server A. Subsequent call control is performed using the SIP server B. Consequently, call control such as call disconnect, transfer, and hold can be continuously performed.

(3) Overview of Method for Copying Session Information

Next, an overview of a method for copying session information according to the first embodiment of the present invention will be described. As described above, when a media session is established, session information is copied and shared between a plurality of SIP servers. The establishment of a media session is determined as described below.

From the messages sent and received during the call control sessions depicted in FIG. 2, media information that defines a method of sending and receiving media data is extracted and monitored. The SIP server A determines whether or not a media session has been established according to the monitoring result. Here, in the call control sessions, the IP phones A and B send and receive media information to each other to perform a negotiation. When a method of sending and receiving media data is determined as a result of the negotiation, a media session is established. Accordingly, the establishment of a media session can be determined by detecting that the IP phones A and B have sent and received media information. The SIP server A of the present embodiment determines that the media session has been established upon detection that media information received from the IP phone A has been sent to the IP phone B and that media information received from the IP phone B has been sent to the IP phone A.

(4) Internal Structure of SIP Server

Figure 3:
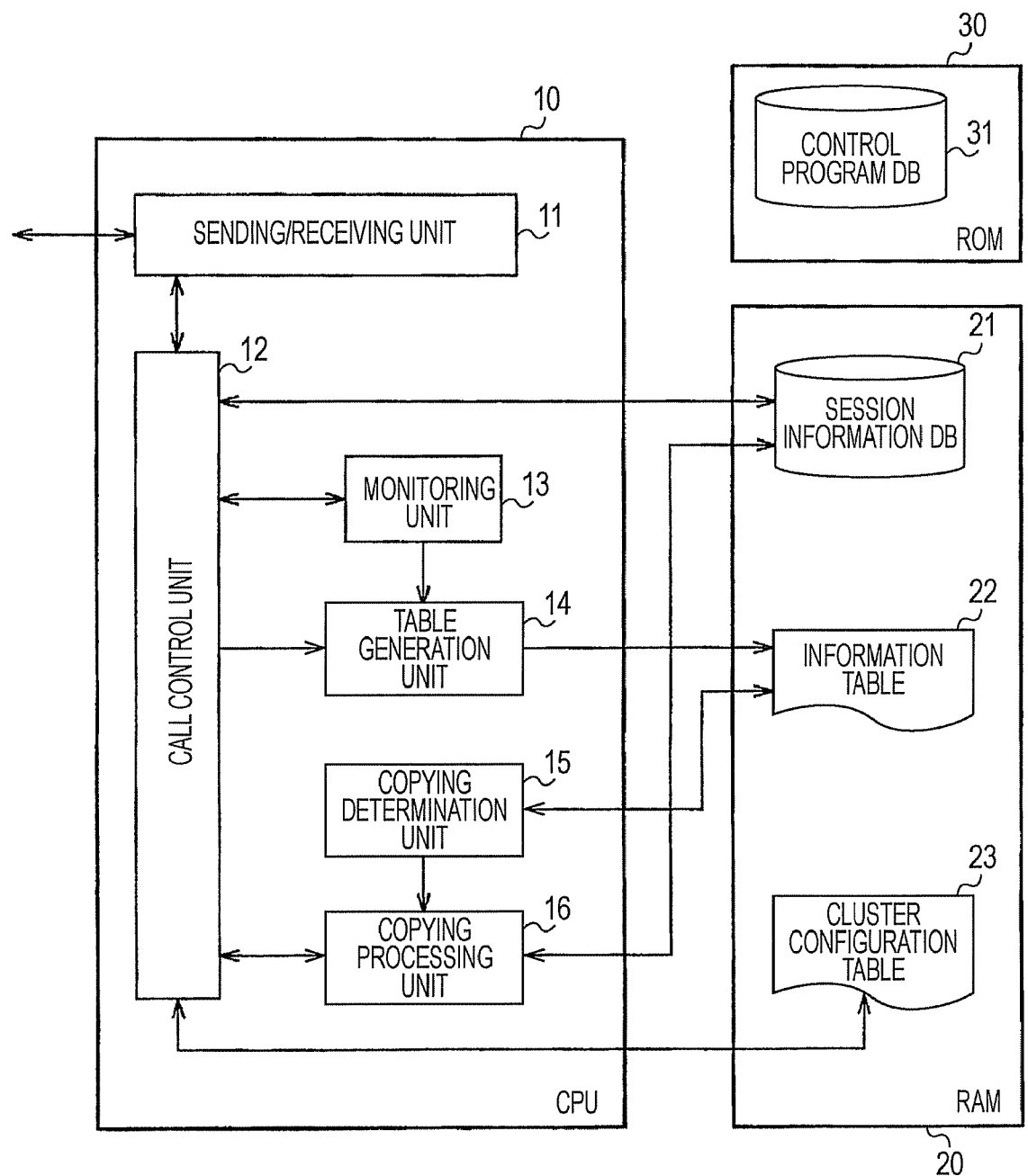
FIG. 3 is a block diagram representing a hardware configuration and functional structure of a SIP server according to the first embodiment.

FIG. 3 is a block diagram representing a hardware configuration and functional structure of the SIP server A according to the first embodiment. The SIP servers A and B have a similar structure, and a description will be given of only the structure of the SIP server A. The SIP server A includes, as hardware components, a central processing unit (CPU) 10 that performs various processes, a random access memory (RAM) 20 that stores data involved in various processes, and a read-only memory (ROM) 30 that stores control programs for performing various processes. The functional structure of the hardware components will now be described.

(4-1) Control Program DB

A control program database (DB) 31 in the ROM 30 stores control programs for performing various processes. For example, control programs for executing protocols such as SIP, Session Description Protocol (SDP), Real-time Transport Protocol (RTP), IP, User Datagram Protocol (UDP), and Transmission Control Protocol (TCP) are stored.

(4-2) Cluster Configuration Table

A cluster configuration table 23 in the RAM 20 stores a combination of SIP servers that form a cluster. FIG. 4 illustrates an example cluster configuration. For example, in the present embodiment, as depicted in FIG. 4, the SIP servers A, B, . . . are stored as SIP servers that form a cluster.

(4-3) Sending/Receiving Unit

A sending/receiving unit 11 in the CPU 10 receives packets sent from the clients A and B, the SIP server B, etc., and sends packets created by a call control unit 12, which will be described below, to the clients A and B, the SIP server B, etc. For example, the sending/receiving unit 11 sends and receives packets for sending and receiving messages involved in the HTTP session, such as an HTTP request and an HTTP response, and packets for sending and receiving various messages or session information involved in the call control sessions.

FIGS. 5A to 11 illustrate examples of description of information included in packets sent and received in the processes depicted in FIG. 2. FIG. 5A illustrates an example of description of an HTTP request based on the GET method, and FIG. 5B illustrates an example of description of a call origination request based on the SIP INFO method. FIG. 6 illustrates an example of description of an INVITE (i) message. FIG. 7 illustrates an example of description of a 200 OK (i) message. FIG. 8 illustrates an example of description of an INVITE (ii) message. FIG. 9 illustrates an example of description of a 200 OK (ii) message. FIG. 10 illustrates an example of description of an INVITE (iii) message. FIG. 11 illustrates an example of description of a 200 OK (iii) message.

(4-4) Call Control Unit and Session Information DB

The call control unit 12 in the CPU 10 receives the HTTP request based on the GET method depicted in FIG. 5A from the sending/receiving unit 11, and analyzes the HTTP request. The HTTP request indicates that a request for a phone call from a caller, alice, to a callee, bob, has been sent to the address of the SIP server A. The term "alice", as used herein, refers to the IP phone A (alice@client1.test.co.jp) on the call originating side, and the term "bob", as used herein, refers to the IP phone B (bob@client2.test.co.jp) on the call receiving side. Then, upon receipt of the HTTP request, the call control unit 12 generates the INVITE (i) message depicted in FIG. 6 and sets a call ID and a SIP session ID. Further, the call control unit 12 generates a call setup request including the IDs and also generates session information.

The term "SIP session", as used herein, is a session that is performed based on SIP between a SIP server and each terminal, and a SIP session ID is an identifier for identifying each SIP session. A SIP session ID can be used to identify a SIP session between the IP phone A and the SIP server A from a SIP session between the IP phone B and the SIP server A. A call ID is an identifier for identifying a call control session, and is used to associate a pair of SIP session IDs with each other. In the present embodiment, the call control unit 12 sets the SIP session ID of the SIP session between the IP phone A and the SIP server A to "1234@sip.test.co.jp", and sets the SIP session ID of the SIP session between the IP phone B and the SIP server A to "5678@sip.test.co.jp". Further, the call control unit 12 sets the call ID of a call control session including the SIP sessions to "12345678".

The term "session information" is information required for a SIP server to perform a call control session with the IP phones A and B. A session information DB 21 receives session information from the call control unit 12 and stores the session information. FIG. 12 illustrates an example of session information generated by the call control unit 12 in response to the HTTP request depicted in FIG. 5A. The session information includes a call ID, a SIP session ID of a SIP session performed by a calling terminal, the name of a terminal that performs each SIP session, the address of each terminal, a SIP session ID of a SIP session performed by a called terminal which is the connection destination, a session state, and caller/callee information for identifying a calling or called party.

Further, upon receipt of a message involved in a call control session from each client, the call control unit 12 generates a response message to the received message or a message for forwarding the received message to another client, and sends the generated message to the clients through the sending/receiving unit 11. The call control unit 12 further obtains information regarding the SIP server B that, together with the SIP server A, forms a cluster from the cluster configuration table 23, which will be described below, and sends session information generated by a copying processing unit 16 described below to the SIP server B via the sending/receiving unit 11.

(4-5) Monitoring Unit, Table Generation Unit, and Information Table

A table generation unit 14 in the CPU 10 receives a call setup request including a call ID and a SIP session ID from the call control unit 12, and prepares an information table 22 in the RAM 20. In the information table 22, as depicted in FIG. 13 described below, call IDs, terminal names, and SIP session IDs, which are included in the call setup request, are set. When messages involved in the call control session are sent and received, media information for determining the establishment of a media session based on the messages is stored in the information table 22.

A monitoring unit 13 in the CPU 10 extracts the media information as information for determining the establishment of a media session based on messages involved in the call control session. Here, it is necessary for each of the IP phones A and B to obtain at least a sending destination address to send the media data to in order to perform a media session. Here, a method of determining the establishment of a media session will be described using sending destination addresses of the media data in media information, by way of example.

The monitoring unit 13 extracts the sending destination addresses from the media information that defines the method of sending and receiving media data in the messages depicted in FIGS. 6 to 11. Here, the monitoring unit 13 has obtained the call ID to which the messages belong, and the sending destination addresses are stored in the information table 22 corresponding to the call ID. First, the configuration of the messages sent and received in the call control session will be described using the INVITE (i) message depicted in FIG. 6.

(i) Configuration of Message

The INVITE (i) message depicted in FIG. 6 is composed of a start line, a header, and a body. The start line describes the type of the request and the sending destination address of the request. The header describes a sending source and destination, etc., of the call control session. For example, the following information is described:

Via: the SIP version, the protocol, and the sending destination of a response to the message.
Max-Forwards: the maximum number of relays allowed for the message.
From: the sender of the message.
To: the receiver of the message.
Call-ID: the SIP session ID.
CSeq: the sequence of the message.
Contact: the sending destination of messages subsequent to the message.
Content-Type: the type of the body.
Content-Length: the size of the body.

The body includes media information. The media information is described using SDP. For example, the following information is described:

v: the version of the sending protocol.
o: the sending source address of the message.
s: the name of the session.
c: the sending destination address to which the recipient of the message is to send the media data, and the type of the network.
t: the start time and end time of the session.
m: the port number of the sending destination of the media data, the type of the media data, and the sending protocol of the media data.
a: the attribute of the media data.

(ii) Change of Information Table

Referring back to FIG. 2, a description will now be given of the sending destination addresses stored in the information table 22 obtained at time points when the messages are sent and received. FIG. 13 illustrates information tables obtained at time points (a1) to (a5) depicted in FIG. 2.

Upon receipt of an HTTP request, the call control unit 12 of the SIP server A generates the INVITE (i) message depicted in FIG. 6, and sends it to the IP phone A via the sending/receiving unit 11 (see process (2)). The monitoring unit 13 receives the INVITE (i) message from the call control unit 12, and extracts a SIP session ID of the message. Further, based on the SIP session ID "1234@sip.test.co.jp", the monitoring unit 13 obtains "12345678" as the call ID to which the message belongs from the session information depicted in FIG. 12. Thus, the table generation unit 14 calls the information table 22 with the call ID "12345678". The monitoring unit 13 further refers to the header of the message, the sending order of messages, etc., to determine whether each of the sending source and sending destination of the message is a calling or called party. The monitoring unit 13 further extracts a C value as a sending destination address from the media information in the INVITE (i) message. In this case, based on the INVITE (i) message depicted in FIG. 6, the monitoring unit 13 extracts "0.0.0.0" as a C value. The table generation unit 14 stores the extracted C value in a corresponding portion of the information table 22 according to the determination of a calling or called party. Thus, the information table 22 as depicted in part (a1) of FIG. 13 is obtained. The information table 22 depicted in part (a1) of FIG. 13 indicates that the C value included in the message sent from the SIP server A to the IP phone A is "0.0.0.0".

Then, the call control unit 12 receives the 200 OK (i) message depicted in FIG. 7 from the IP phone A (see process (3)). The monitoring unit 13 receives the 200 OK (i) message from the call control unit 12, and extracts "10.254.214.60" as a C value from the media information. The information table 22 with the call ID "12345678" as depicted in part (a2) of FIG. 13 is obtained. The information table 22 depicted in part (a2) of FIG. 13 indicates that the C value included in the message received at the SIP server A from the IP phone A is "10.254.214.60".

Then, when the call control unit 12 generates the INVITE (ii) message depicted in FIG. 8 and sends it to the IP phone B (see process (4)), the monitoring unit 13 extracts "10.254.214.60" as a C value from the media information. The information table 22 as depicted in part (a3) of FIG. 13 is obtained. The information table 22 depicted in part (a3) of FIG. 13 indicates that the C value included in the message sent from the SIP server A to the IP phone B is "10.254.214.60".

Then, when the call control unit 12 receives the 200 OK (ii) message depicted in FIG. 9 from the IP phone B (see process (6)), the monitoring unit 13 extracts "10.254.214.130" as a C value from the media information. The information table 22 as depicted in part (a4) of FIG. 13 is obtained. The information table 22 depicted in part (a4) of FIG. 13 indicates that the C value included in the message received at the SIP server A from the IP phone B is "10.254.214.130".

Further, when the call control unit 12 generates the INVITE (iii) message depicted in FIG. 10 and sends it to the IP phone A (see process (8)), the monitoring unit 13 extracts "10.254.214.130" as a C value from the media information. The information table 22 as depicted in part (a4) of FIG. 13 is obtained. The information table 22 depicted in part (a4) of FIG. 13 indicates that the C value included in the message sent from the SIP server A to the IP phone A is "10.254.214.130".

(4-6) Copying Determination Unit

A copying determination unit 15 determines whether or not a media session has been established between the IP phones A and B. The copying determination unit 15 regards the time at which a media session is established as a time at which the session information is copied and sent, and sends a media session establishment notification to the copying processing unit 16.

Prior to the start of a media session, in a call control session, the IP phones A and B send and receive media information to each other to perform a negotiation, and determine a method of sending and receiving the media data. The media information includes, as described above, sending destination addresses of media data. Once sending destination addresses to which the IP phones A and B are to send media data are determined, a media session is allowed to start. The copying determination unit 15 detects that the IP phone A has sent a message including a sending destination address to the SIP server A and that the SIP server A sends or has sent a message including the sending destination address to the IP phone B. The copying determination unit 15 further detects that the IP phone B has sent a message including a sending destination address to the SIP server A and that the SIP server A sends or has sent a message including the sending destination address to the IP phone A. Therefore, the copying determination unit 15 can determine that a media session has been established.

In order to determine the establishment of a media session using the method described above, the information table 22 is referred to in the following manner. The copying determination unit 15 detects a match in the information table 22 between the sending destination address received at the SIP server A from the IP phone A and the sending destination address received at the SIP server A from the IP phone B. Thus, it is found that a sending destination address has been sent from the IP phone A to the IP phone B. The copying determination unit 15 further detects a match in the information table 22 between the sending destination address received at the SIP server A from the IP phone B and the sending destination address received at the SIP server A from the IP phone A. Thus, it is found that a sending destination address has been sent from the IP phone B to the IP phone A. It is therefore determined that the sending destination addresses have been exchanged between the IP phones A and B.

Specifically, in the information table 22 obtained at the time point (a4), the sending destination address received at the SIP server A from the IP phone A is "10.254.214.60", and the sending destination address sent from the SIP server A to the IP phone B is "10.254.214.60". Both addresses match. On the other hand, the sending destination address received at the SIP server A from the IP phone B is "10.254.214.130", and the sending destination address sent from the SIP server A to the IP phone A is "0.0.0.0". Both addresses do not match. Therefore, the copying determination unit 15 determines that no media session has been established.

In the information table 22 obtained at the time point (a5), the sending destination address sent from the SIP server A to the IP phone A is updated to "10.254.214.130" from that obtained at the time point (a4). Thus, the sending destination address received at the SIP server A from the IP phone B is "10.254.214.130", and the sending destination address sent from the IP server A to the IP phone A is "10.254.214.130". Both addresses match. Therefore, the copying determination unit 15 determines that a media session has been established.

Note that no comparison is available in the information table 22 at the time points (a1) to (a3) because the C value is not filled in.

(4-7) Copying Processing Unit

Upon receipt of a notification indicating that a media session has been established from the copying determination unit 15, the copying processing unit 16 copies the session information stored in the session information DB 21. The call control unit 12 sends the copied session information to the SIP server B via the sending/receiving unit 11.

(5) Processing Flow

Figure 14:
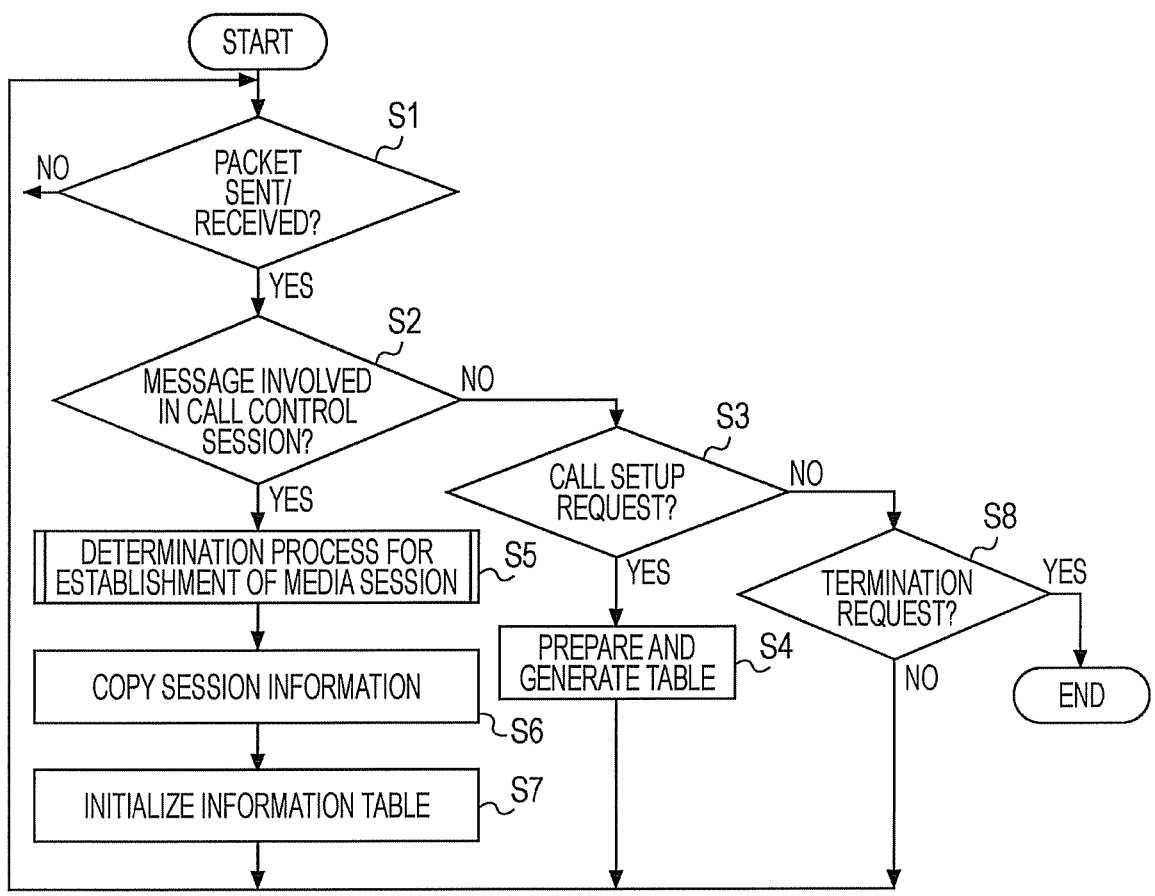
FIG. 14 is a flowchart representing an overall flow of a method for copying session information at a SIP server according to the first embodiment.
Figure 15:
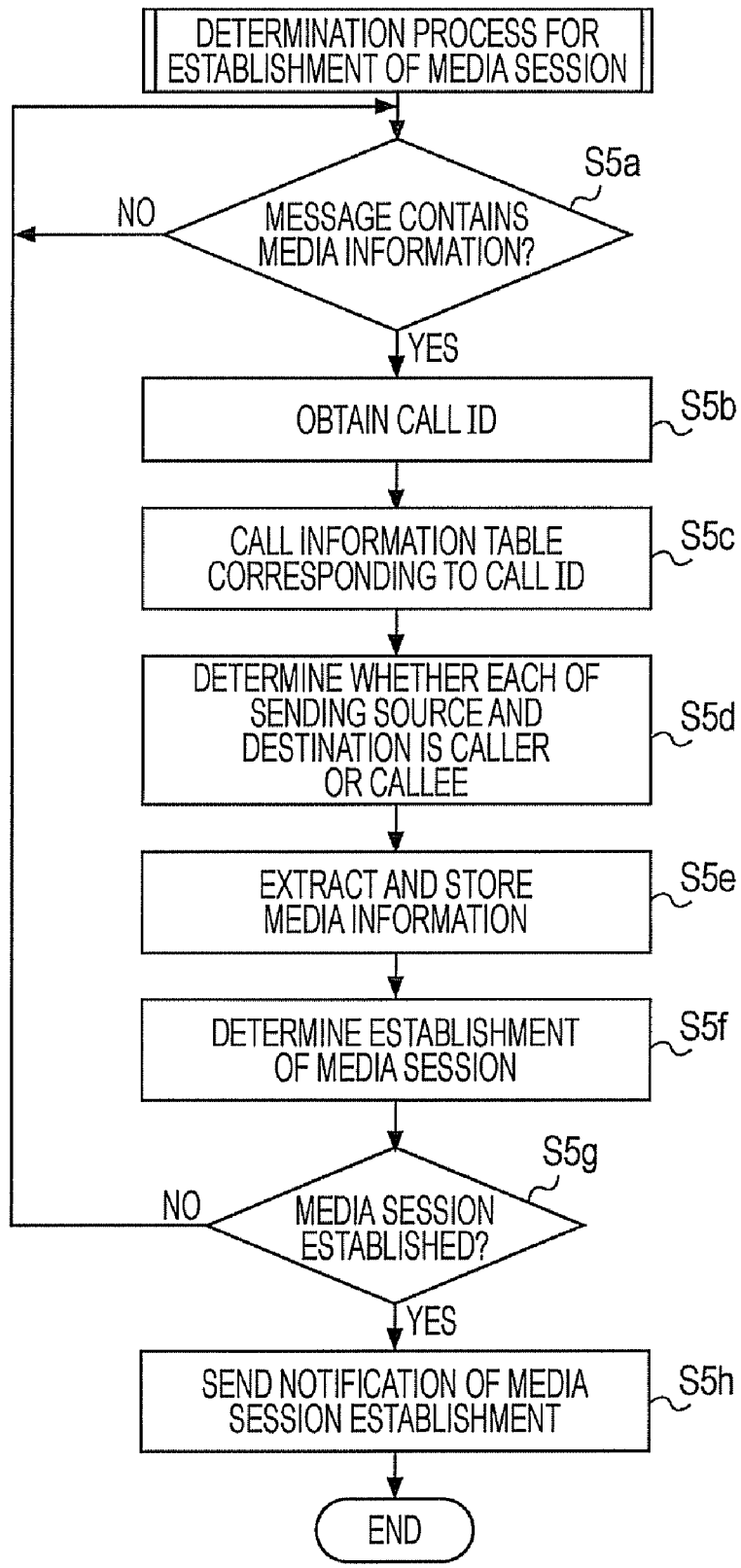
FIG. 15 is a flowchart representing a flow of a determination process for the establishment of a media session according to the first embodiment.

Next, a processing flow of a method for copying session information at a SIP server will be described with reference to FIGS. 14 and 15. FIG. 14 is a flowchart representing an example of the overall flow of a method for copying session information at a SIP server according to the first embodiment. FIG. 15 is a flowchart representing an example of a flow of a determination process for the establishment of a media session according to the first embodiment. First, the overall flow of the method for copying session information will be described, followed by the determination process for the establishment of a media session.

(5-1) Overall Flow of Method for Copying Session Information

Operation S1: When the sending/receiving unit 11 sends or receives a packet, the method proceeds to operation S2. For example, the sending/receiving unit 11 sends the packet generated by the call control unit 12 to outside the SIP server A, or receives a packet from outside the SIP server A. The call control unit 12 receives the packet received at the sending/receiving unit 11 from outside the SIP server A. If no packet has been sent or received, on the other hand, the method waits until the sending/receiving unit 11 has sent or received a packet.

Operation S2: Upon receipt of an HTTP request based on the GET method serving as an origination request, the call control unit 12 sets a call ID and a SIP session ID. Further, the call control unit 12 generates a call setup request including the IDs and also generates session information. The session information DB 21 stores the session information. When a media session disconnection request is received from an IP phone, on the other hand, the call control unit 12 generates a termination request.

The call control unit 12 sends a message involved in the call control session and the call setup request to the monitoring unit 13 and the table generation unit 14. When the monitoring unit 13 receives the message, the method proceeds to operation S5. When the table generation unit 14 receives the call setup request, the method proceeds to operations S3 and S4. When the call control unit 12 generates a termination request, the method proceeds to operation S8.

Operations S3 and S4: Upon receipt of the call setup request from the call control unit 12, the table generation unit 14 sets the call ID, the terminal name, and the SIP session ID to prepare the information table 22, and generates any other required table.

Operation S5: When the monitoring unit 13 receives the message, a determination process for the establishment of a media session is performed.

Operation S6: When it is determined in operation S5 that a media session has been established, the copying processing unit 16 copies the session information stored in the session information DB 21. The call control unit 12 sends the copied session information to the SIP server B via the sending/receiving unit 11.

Operation S7: After the copying of the session information has been completed, the information table 22 is initialized.

Operation S8: The call control unit 12 sends a termination request such as a BYE message to the IP phones A and B to terminate the call control session. If no message involved in the call control session has been received or if no termination request or call setup request has been generated, the method returns to operation S1.

(5-2) Flow of Determination Process for Establishment of Media Session

Operation S5$a$: If the message includes media information, the monitoring unit 13 proceeds to operation S5$b$. If the message does not include media information, the process waits.

Operation S5$b$: The monitoring unit 13 obtains a SIP session ID from the message, and obtains a corresponding call ID from the session information DB 21.

Operation S5$c$: The table generation unit 14 obtains the call ID from the monitoring unit 13, and calls an information table 22 corresponding to the call ID.

Operation S5$d$: The monitoring unit 13 refers to the header of the message, the sending order of messages, etc., to determine whether each of the sending source and sending destination of the message is a calling or called party.

Operation S5$e$: The monitoring unit 13 extracts media information from the message. For example, the monitoring unit 13 extracts the C value from the message. Further, the table generation unit 14 stores the C value in a corresponding portion of the information table 22 according to the determination of a calling or called party in operation S5$d$.

Operation S5$f$: Then, the copying determination unit 15 refers to the information table 22 to detect that the sending destination address to which the IP phone A is to send the media data and the sending destination address to which the IP phone B is to send the media data have been sent and received between the IP phones A and B. Upon detection that the sending destination addresses have been sent and received, the copying determination unit 15 determines that a media session has been established.

Operation S5$g$: If a media session has been established, the process proceeds to operation S5$h$, or the process returns to operation S5$a$ otherwise.

Operation S5$h$: The copying determination unit 15 sends a notification indicating that a media session has been established to the copying processing unit 16 to instruct that the session information be copied. Note that the process of obtaining a call ID and calling the information table 22, the process of determining a calling or called party, and the process of extracting media information, which are included in operations S5$b$ to S5$e$, may be performed in random order.

According to the method for copying session information described above, session information is copied and sent in a case where a media session has been established, rather than when messages involved in a call control session are sent and received. Therefore, the number of times session information is copied and sent can be reduced, resulting in a reduction in the processing load on the SIP server. Furthermore, the network load caused by frequently sending and receiving session information can be reduced.

Even if a media session start request is sent from a calling terminal, a media session is not established in a special case, such as when a user at a called terminal is not answering or is engaged in a telephone conversation with another user. In such a case, a SIP server serving as an alternative server may not necessarily use the copied session information even though the SIP has received it. According to the method for copying session information described above, session information is copied and sent in a case where a media session has been established. This can prevent SIP servers from performing unnecessary processes and can reduce extra resource consumption when the partner is busy in another call or not answering.

Furthermore, the establishment of a media session is detected by referring to media information that describes a method of sending and receiving media data. This ensures that the establishment of a media session can be detected.

(6) Modifications (6-1) First Modification

Figure 16:
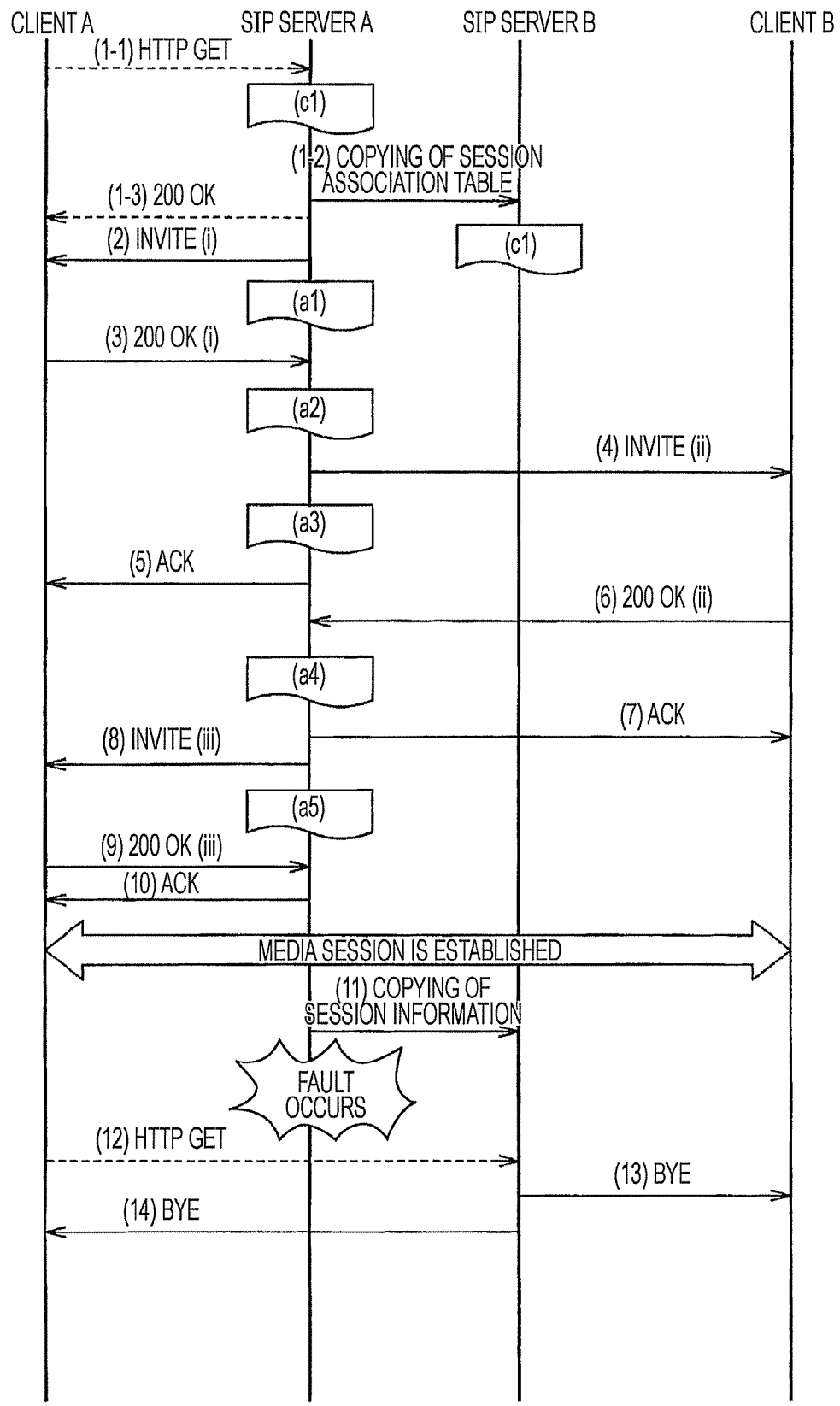
FIG. 16 is a chart representing an example of a flow including a call control session according to a first modification.

In a first modification, in addition to the copying of session information, the generation and copying of information regarding an HTTP session is performed. FIG. 16 illustrates an example of a flow including a call control session according to the first modification. In place of the process (1) depicted in FIG. 2 according to the foregoing embodiment, processes (1-1) to (1-3) are performed. Additionally, when a fault has occurred in the SIP server A, the SIP server B takes over the call control session from the SIP server A in accordance with an HTTP request from the browser terminal A to the SIP server B. The remaining flow of the first modification depicted in FIG. 16 is similar to that of the foregoing embodiment. FIG. 17 illustrates an example of description of information included in packets sent and received in the processes (1-1) and (1-3).

The call control unit 12 of the SIP server A receives an HTTP request from the browser terminal A (see process (1-1)). Upon receipt of the HTTP request, the call control unit 12 sets an HTTP session ID as well as a call ID and a SIP session ID. The HTTP session ID is an identifier for identifying an HTTP session performed between each terminal and a SIP server. The HTTP session ID can be used to identify which HTTP session is being performed between which terminal and which SIP server. Further, the call control unit 12 generates a call setup request including the call ID, the SIP session ID, and the HTTP session ID and also generates session information.

In response to the call setup request from the call control unit 12, the table generation unit 14 generates a session association table (not depicted) in the RAM 20 and sends the session association table to the SIP server B (see process (1-2)

and time point (c1)). The term "session association table" refers to a table for associating sessions based on different protocols. FIG. 18 illustrates an example of a session association table obtained at time point (c1) of FIG. 16. If the call control unit 12 sets the call ID to "12345678" and the HTTP session ID to "H1234", a session association table depicted in FIG. 18 is generated. Thus, the call control session and the HTTP session are associated with each other. In the session association table, the SIP server A is registered as a main server that is currently performing the call control session and the SIP server B is registered as an alternative server. As an alternative server, based on the cluster configuration table 23, a SIP server that, together with the main server, forms a cluster and that is allowed to take over the call control session is registered.

In response to the HTTP request, the call control unit 12 generates a 200 OK message based on HTTP and sends it to the browser terminal A. At this time, the browser terminal A is notified of the HTTP session ID as depicted in FIG. 17. In response to the HTTP request, the call control unit 12 also generates an INVITE (i) message based on SIP and sends it to the IP phone A (see process (2)).

It is assumed that a fault has occurred in the SIP server A in the manner depicted in FIG. 16. In this case, due to the occurrence of a fault in the SIP server A, there is no response from the SIP server A even though the browser terminal A sends a message to the SIP server A in accordance with an input from the user. Then, the browser terminal A sends an HTTP request based on the GET method including "H1234" as an HTTP session ID to the SIP server B (see process (12)). The SIP server B obtains the HTTP session ID from the HTTP request, and further obtains the call ID based on the HTTP session ID from the session association table. Therefore, the SIP server B can obtain the corresponding session information based on the obtained call ID and can take over the call control session from the SIP server A. For example, when the user clicks a "disconnect" button on a WWW screen, the SIP server B sends a BYE message to the IP phones A and B in accordance with the session information, and terminates the call control session and the media session (see processes (13) and (14)).

As described above, the SIP server B serving as an alternative server maintains the session association table generated by the SIP server A serving as a main server. This enables the SIP server B to take over a call control session, such as the termination of a media session, from the SIP server A in accordance with an HTTP message from the browser terminal A. Meanwhile, the user can execute a call control session, such as the termination of a media session, using the browser terminal A.

In operation S2 depicted in FIG. 14 described above, the call control unit 12 sets an HTTP session ID in addition to a call ID and a SIP session ID, and generates a call setup request including the IDs and session information. Further, in operations S3 and S4, upon receipt of the call setup request from the call control unit 12, the table generation unit 14 generates a session association table in which the call ID, the HTTP session ID, etc., are set, as well as preparing the information table 22.

Note that the timing at which a session association table is generated and copied is not limited to the timing described above, and a session association table can be generated and copied at any time point after the start of a call control session. For example, a session association table may be generated and copied at the same time as the time at which session information is copied. Furthermore, the browser terminal A may be notified of, in addition to the HTTP session ID, information regarding the main server and the alternative server using the 200 OK message in process (1-3). This allows the browser terminal A to recognize which alternative server to access when a fault has occurred in the main server.

(6-2) Second Modification

Figure 19:
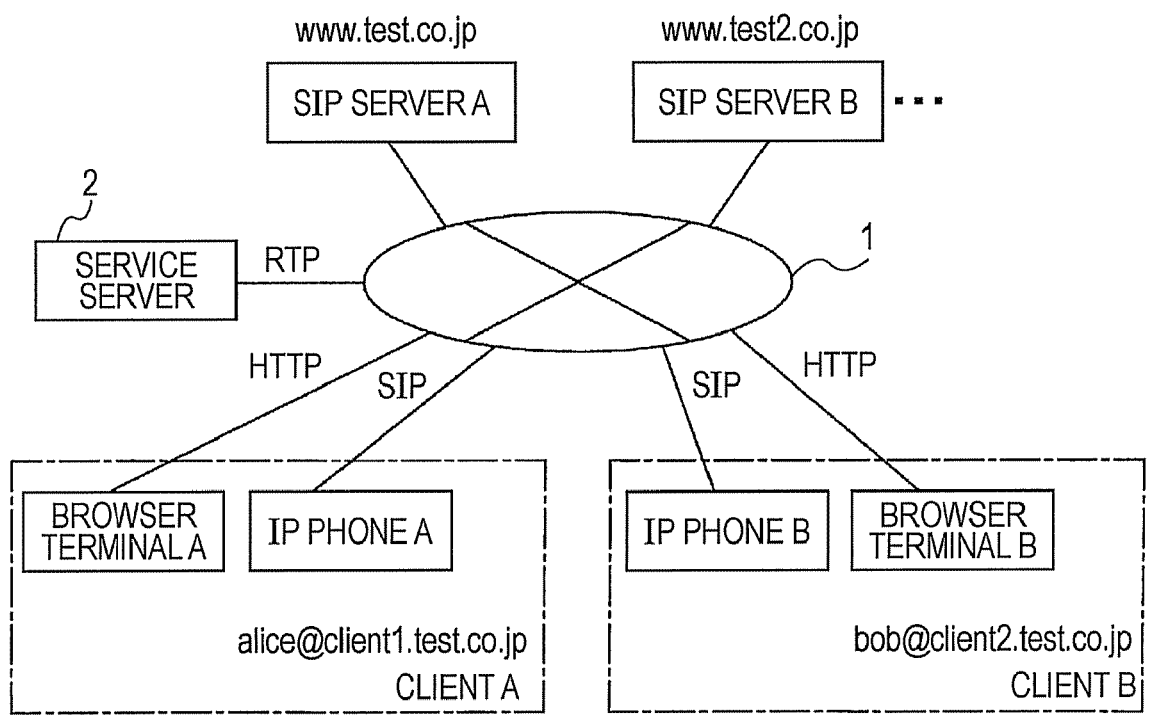
FIG. 19 is a network configuration diagram according to a second modification.
Figure 20:
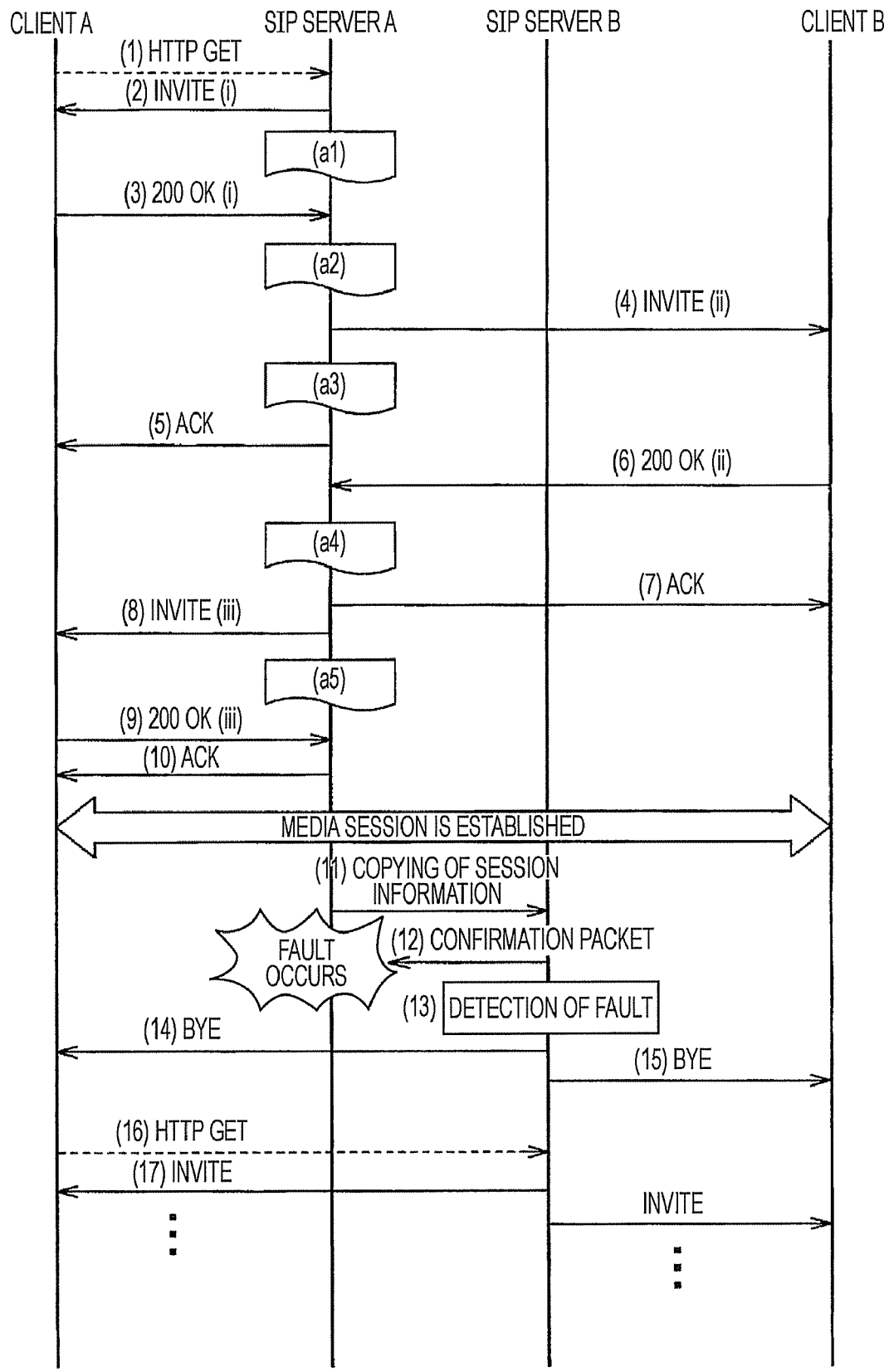
FIG. 20 is a chart representing a flow including a call control session according to the second modification.
Figure 21:
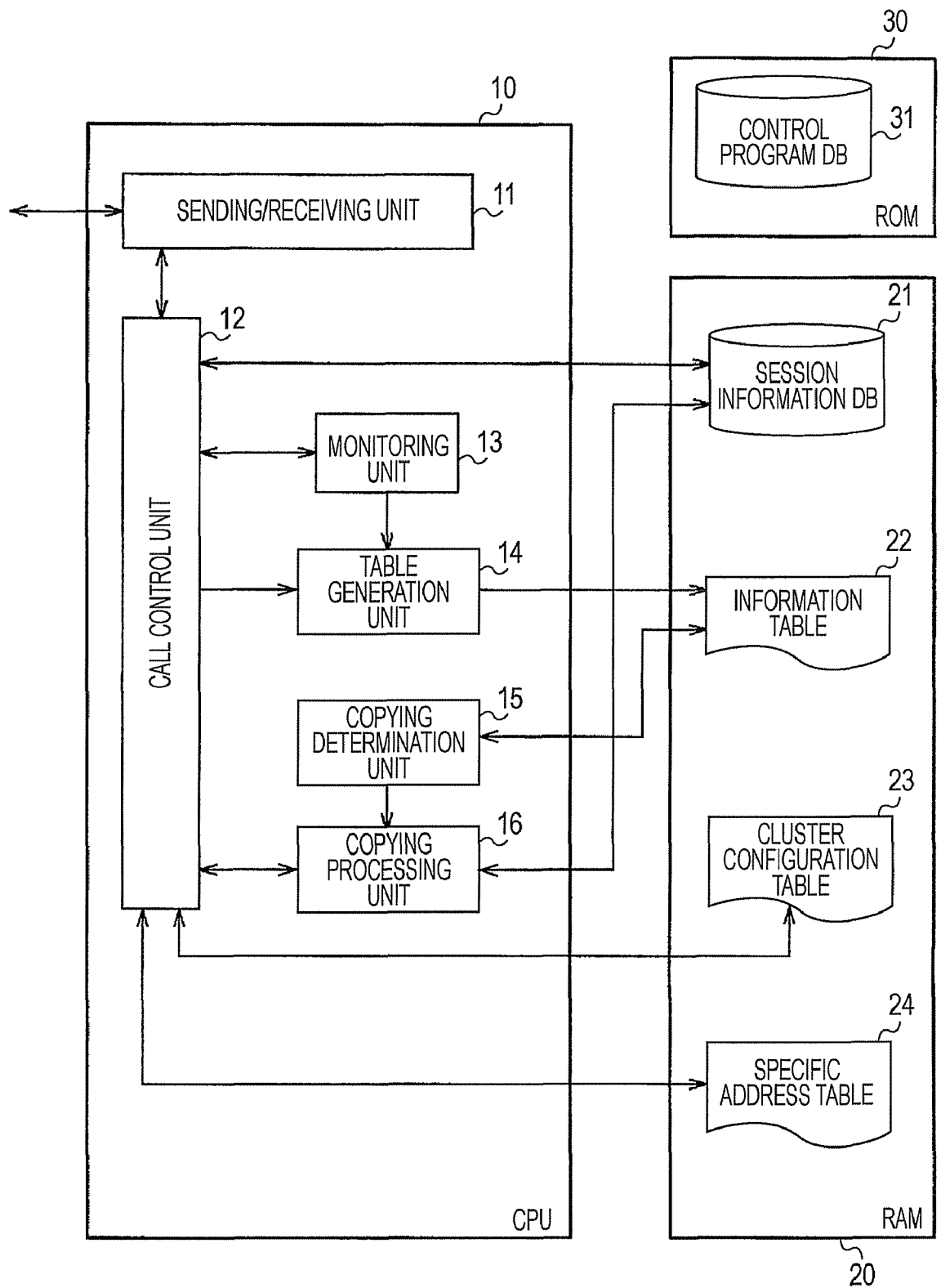
FIG. 21 is a block diagram representing a hardware configuration and functional structure of a SIP server according to the second modification.

In a second modification, a method of determining the establishment of a media session in a case where a media session is performed via a service server will be described. FIG. 19 is a network configuration diagram according to the second modification. The difference from the configuration depicted in FIG. 1 according to the foregoing embodiment is that a service server 2 is connected to the network 1. The remaining configuration is similar to that of FIG. 1. FIG. 20 illustrates an example of a flow including a call control session according to the second modification. A call control session is performed in a manner similar to that depicted in FIG. 2 according to the foregoing embodiment. The difference from the flow depicted in FIG. 2 is media information to be sent and received and information stored in the information table 22. FIG. 21 is a block diagram representing a hardware configuration and functional structure of the SIP server A according to the second modification. The difference from the hardware configuration and functional structure depicted in FIG. 3 according to the foregoing embodiment is that the RAM 20 has a specific address table 24. The remaining configuration is similar to that of FIG. 3.

Figure 22:
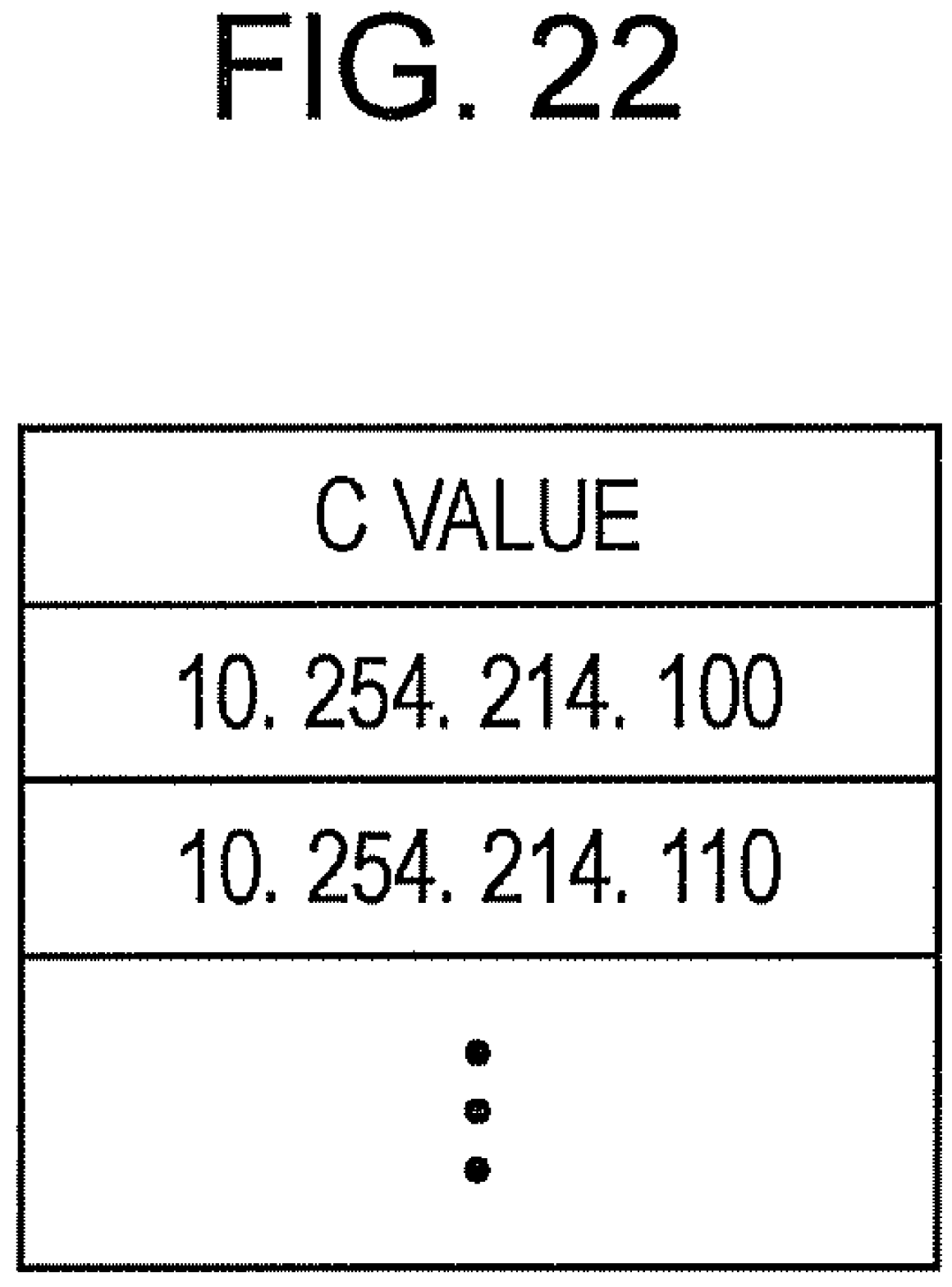

The service server 2 may provide various services, such as recording of telephone conversations, announcements during telephone conversations, and modification of media data. In a case where a service by the service server 2, as well as a service of the SIP server A is provided, the SIP server A sets, in the service server 2, sending destination addresses to which the IP phones A and B are to send media data. Next, a method of setting sending destination addresses will be described. The specific address table 24 in the SIP server A stores associations between the service server 2 and a plurality of specific addresses. FIG. 22 illustrates an example of a specific address table. The service server 2 is associated with a plurality of C values representing sending destination addresses of media data. The call control unit 12 of the SIP server A assigns a specific address selected from the specific address table 24 to each of the IP phones A and B. For example, the call control unit 12 assigns "10.254.214.110" as a sending destination address to which the IP phone A is to send the media data and "10.254.214.100" as a sending destination address to which the IP phone B is to send the media data. In a case where a media session has been established, the IP phones A and B send and receive media data to each other using the assigned sending destination addresses.

In the above case, the SIP server A detects that the specific addresses associated with the service server 2 have been assigned to the IP phones A and B to thereby determine that a media session has been established. In other words, it is determined whether the sending destination addresses sent from the SIP server A to the IP phones A and B are addresses stored in the specific address table 24. This operation will now be specifically described.

A call control session as depicted in FIG. 20 is performed between the SIP server A and the IP phones A and B. The description of information included in packets in processes (4) and (8) among processes (1) to (9) depicted in FIG. 20 is different from that of the foregoing embodiment. FIG. 23 illustrates an example of description of an INVITE (ii) message in the second modification, and FIG. 24 illustrates an example of description of an INVITE (iii) message in the second modification. As in the foregoing embodiment, the monitoring unit 13 extracts sending destination addresses from messages sent and received in the call control session. The table generation unit 14 stores the sending destination addresses in the information table 22. FIG. 25 illustrates information tables obtained at time points (a1), (a2), and (b1) to (b3) depicted in FIG. 20. The information table 22 at the time points (a1) and (a2) is similar to that of the foregoing embodiment.

Upon receipt of a 200 OK (i) message from the IP phone A, in process (4), the call control unit 12 generates the INVITE (ii) message depicted in FIG. 23 and sends it to the IP phone B. The monitoring unit 13 extracts "10.254.214.100" as a C value from the media information. The information table 22 as depicted in part (b1) of FIG. 20 is obtained. The information table 22 depicted in part (b1) of FIG. 20 indicates that the C value included in the message sent from the SIP server A to the IP phone B is "10.254.214.100".

Further, in process (6), when the call control unit 12 receives the 200 OK (ii) message depicted in FIG. 9 from the IP phone B, the information table 22 as depicted in part (b2) of FIG. 25 is obtained. Further, in process (8), the call control unit 12 generates the INVITE (iii) message depicted in FIG. 24 and sends it to the IP phone A. The monitoring unit 13 extracts "10.254.214.110" as a C value from the media information. The information table 22 as depicted in part (b3) of FIG. 25 is obtained. The information table 22 depicted in part (b3) of FIG. 25 indicates that the C value included in the message sent from the SIP server A to the IP phone A is "10.254.214.110".

The copying determination unit 15 determines whether or not the sending destination addresses sent from the SIP server A to the IP phones A and B have been stored in the specific address table 24. In the information table 22 at the time points (a1), (a2), (b1), and (b2), the sending destination address sent from the SIP server A to the IP phone A is "0.0.0.0", which is an address not stored in the specific address table 24. In the information table 22 at the time point (b3), on the other hand, the sending destination address sent from the SIP server A to the IP phone A is "10.254.214.110", and the sending destination address sent from the SIP server A to the IP phone B is "10.254.214.100". Both are addresses stored in the specific address table 24. Therefore, the copying determination unit 15 determines that a media session has been established. An example has been described herein in which a service server is assigned a plurality of different IP addresses and in which different IP addresses are used for the IP phones A and B. Alternatively, a service server may be assigned the same IP address and may have different port numbers.

Also in a case where a media session is performed via the service server 2, as in the foregoing embodiment, the processing load on a SIP server and the network load can be reduced.

(6-3) Third Modification

In the foregoing embodiment, sending destination addresses are extracted from media information and are stored in the information table 22. In a third modification, port numbers are further extracted from media information and are stored in the information table 22.

FIG. 26 illustrates information tables obtained at the time points (a1) to (a5) depicted in FIG. 2 according to the third modification. The monitoring unit 13 according to the third modification refers to the messages depicted in FIGS. 5 to 11 to extract the C values and the m values which includes sending destination port numbers. The table generation unit 14 stores the extracted values in the information table 22. The copying determination unit 15 detects whether or not the IP phones A and B have sent and received sending destination addresses and sending destination port numbers to each other. Specifically, in the third modification, the copying determination unit 15 further detects that the IP phone A has sent a message including a sending destination address and a sending destination port number to the SIP server A and that the SIP server A has sent a message including the sending destination address and the sending destination port number to the IP phone B. The copying determination unit 15 also detects that the IP phone B has sent a message including a sending destination address and a sending destination port number to the SIP server A and that the SIP server A has sent a message including the sending destination address and the sending destination port number to the IP phone A. In the foregoing description in the section (4-6), a temporary media session is established between terminals and a server using a special IP address (for example, "0.0.0.0"). Accordingly, even when a temporary media session is established using a special port number (for example, "0"), the copying determination unit 15 can correctly determine whether a media session has been established between the terminals.

This is effective, for example, in the case of access to an audio guide service that allows presetting of the IP addresses of connection destinations but does not allow presetting of dynamically set port numbers. For example, in a SIP message to be initially sent to the IP phone A, the C value is set to an IP address and the port number in the m value is set to "0".

(6-4) Fourth Modification

In the foregoing embodiment, when, in FIG. 2, the INVITE (iii) message is sent from the SIP server A to the IP phone A (see process (8)) and the information table 22 at the time point (a5) is obtained, the copying determination unit 15 determines that a media session has been established.

In a fourth modification, the determination based on the information table 22 is performed in the manner described above. In addition, it is determined whether or not a 200 OK message and an ACK message have been sent and received in response to the message that the determination of the establishment of a media session is based. Specifically, the monitoring unit 13 detects that the IP phone A has sent a 200 OK (iii) message in response to the INVITE (iii) message, and further detects that the SIP server A has sent an ACK message to the IP phone A in response to the 200 OK (iii) message (see processes (9) and (10)). The copying determination unit 15 receives the detection results, and determines that a media session has been established after the messages have been sent and received.

In SIP, a call control session between a SIP server and calling and called terminals is performed in three stages: voice conversation request, response, and confirmation. Therefore, it is determined that a media session has been established using an information table, and it is further detected that a 200 OK message and an ACK message have been sent and received. This ensures that the establishment of a media session can be determined.

<Second Embodiment>

In the first embodiment, the SIP server B serving as an alternative server receives session information from the SIP server A after the establishment of a media session. In a second embodiment, the SIP server B temporarily receives session information from the SIP server A before the establishment of a media session, and subsequent reception of the session information is performed after the establishment of the media session. This allows the SIP server B to take over the call control session performed by the SIP server A even if a fault has occurred in the SIP server A before the establishment of a media session.

(1) Structure

An overall structure, functional structure, and hardware configuration of the second embodiment are similar to those of the first embodiment and will not be discussed herein.

Figure 27:
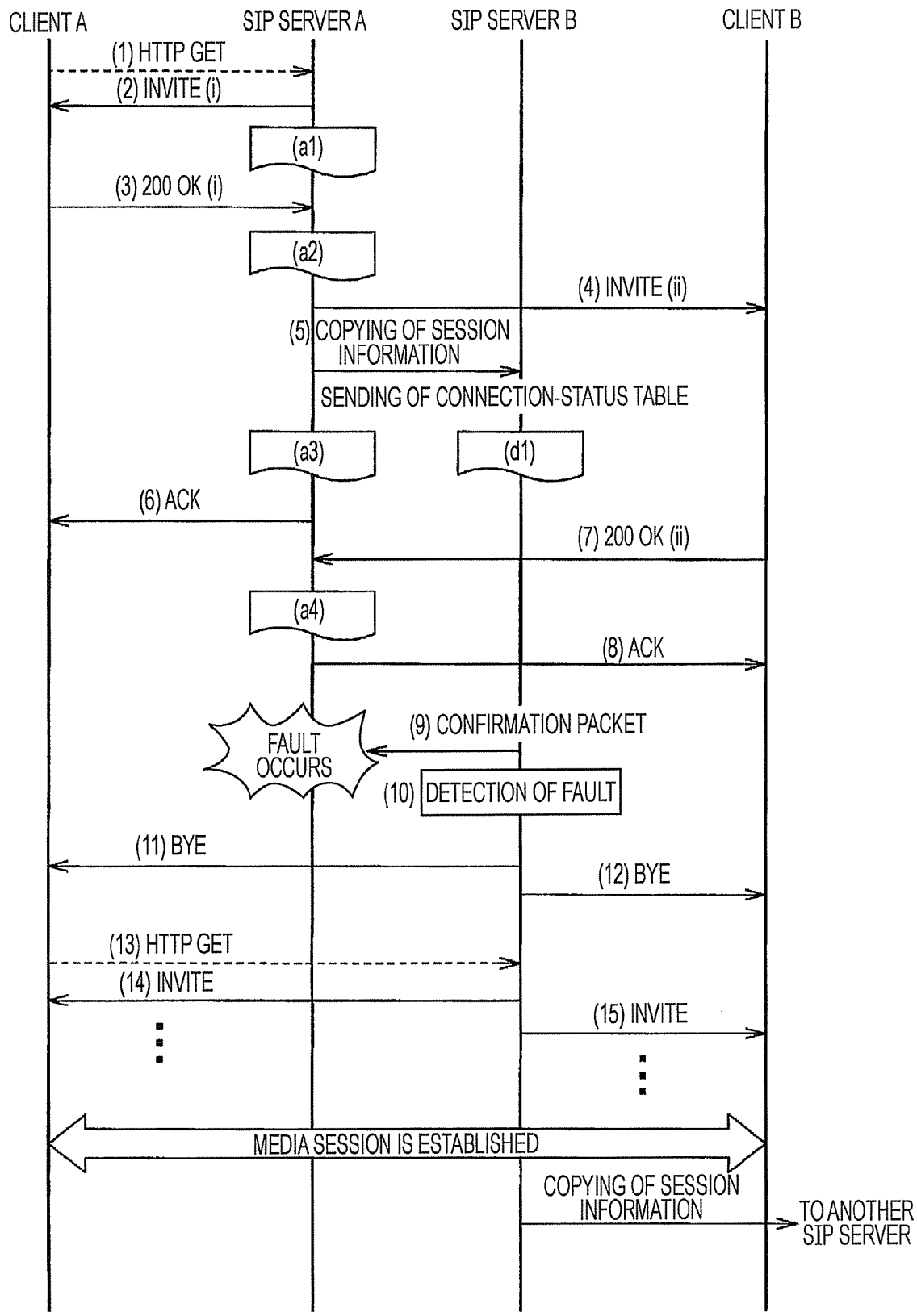
FIG. 27 is a chart representing an example of a flow including a call control session according to a second embodiment.

(2) Overview of Process (2-1) FIG. 27 illustrates an example of a flow including a call control session according to the second embodiment.

In FIG. 27, processes (1) to (4) and (6) to (8) are the same as or similar to the processes (1) to (7) in the first embodiment, respectively. In FIG. 27, information tables obtained at time points (a1) to (a4) are the same as or similar to those obtained at the time points (a1) to (a4) in the first embodiment, respectively.

In response to a request from the user A, the browser terminal A sends an HTTP request based on the GET method serving as a call origination request to the SIP server A (see process (1)). Then, an INVITE (i) message, a 200 OK (i) message, and an INVITE (ii) message are sent and received between the SIP server A and the IP phones A and B (see processes (2) to (4)).

At any time before the establishment of a media session, the copying processing unit 15 of the SIP server A temporarily copies session information and sends the copied session information to the SIP server B that, together with the SIP server A, forms a cluster (see process (5)). The table generation unit 14 of the SIP server A further generates a connection-status table. Here, the call control unit 12 of the SIP server A generates a connection start notification upon receipt of an HTTP request. The table generation unit 14 receives the connection start notification, and sets the connection status in the connection-status table to a connection waiting state. The term "connection waiting state" means that a call control session is in progress and a connection for a media session is ready. FIG. 28 illustrates an example of a connection-status table obtained at time point (d1) depicted in FIG. 27. For each call ID, the main server, the alternative server, the address of the IP phone A, the address of the IP phone B, and the connection status are registered. In the connection-status table depicted in FIG. 28, the call ID of the call control session is "12345678", and the connection status is set to the connection waiting state. The call control unit 12 of the SIP server A sends the connection-status table to the SIP server B (see process (5) and time point (d1) depicted in FIG. 27).

Thereafter, when the copying determination unit 15 of the SIP server A determines that a media session has been established, the call control unit 12 of the SIP server A generates a connection completion notification and sends it to the SIP server B. In response to the notification, the table generation unit 14 of the SIP server B changes the connection status to a connection completed state. For example, in a call control session having a call ID of "11111111", a media session has been established and the connection status has been set to the connection completed state.

The call control unit 12 of the SIP server A copies the connection-status table in which the connection status is set to the connection waiting state, and sends the copied connection-status table to the SIP server B together with a connection start notification. Upon receipt of the connection start notification from the SIP server A, the SIP server B receives and maintains the connection-status table. Thereafter, it is assumed that a fault has occurred in the SIP server A during the sending and receiving of messages involved in the call control session. The SIP server B regularly sends a confirmation packet for detecting the occurrence of a fault in the SIP server A, and detects a fault in the SIP server A on the basis of a response packet (see processes (9) and (10)).

The call control unit 12 of the SIP server B searches the connection-status table for a record in which the SIP server B and the SIP server A are set as the alternative server and the main server, respectively, and in which the connection status is set to the connection waiting state. In other words, call control sessions controlled by the SIP server A are searched for a call control session in which no media session has been established and which has not been completed. Due to the occurrence of a fault, the SIP server A can no longer continue the call control session. Therefore, the SIP server B sends a BYE message to the IP phones A and B, which are involved in the found call control session, and terminates the call control session performed by the SIP server A (see processes (11) and (12)).

Thereafter, the IP phones A and B perform a call control session via the SIP server B, serving as an alternative server, to establish a media session (see processes (13) to (15)). Therefore, when a fault has occurred in a main server, an alternative server temporarily releases an on-going call control session for which the connection processing has not yet been completed among call control sessions performed by the main server. This can improve system stability.

(2-2) An example will now be described in which extra resource consumption is reduced with respect to the connection-status table generated in the section (2-1) described above.

Figure 29:
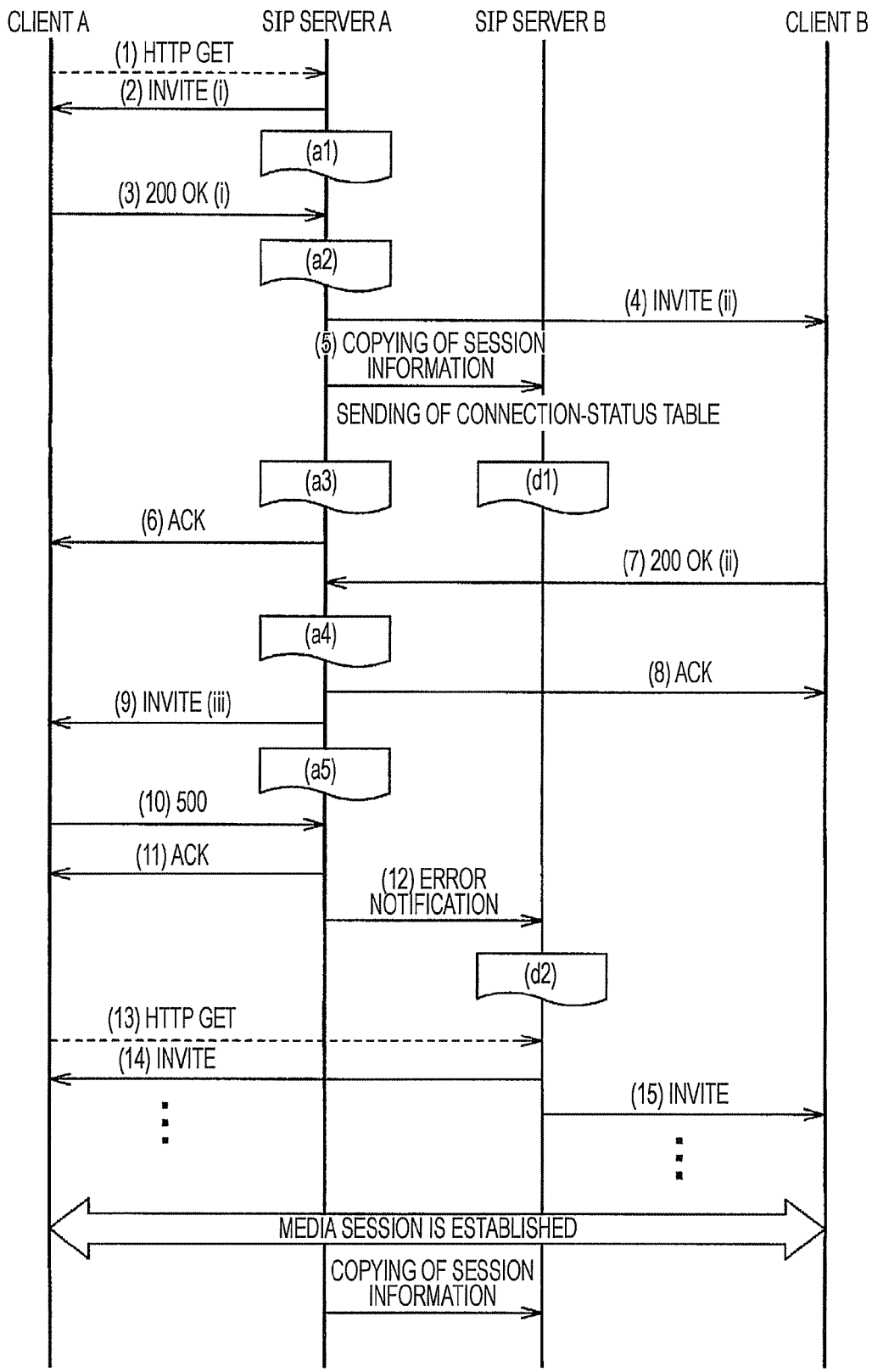
FIG. 29 is a chart representing another example of a flow including a call control session according to the second embodiment.

FIG. 29 illustrates another example of a flow including a call control session according to the second embodiment. In FIG. 29, processes (1) to (8) are the same as or similar to the section (2-1) described above. When the SIP server A sends an INVITE (iii) message to the IP phone A (see process (9)), for example, it is assumed that the IP phone A sends an error message whose code is "500" (see process (10)). Upon receipt of the error message from the IP phone A, the call control unit 12 of the SIP server A generates an ACK message and a connection failure notification indicating that a media session is not successfully established. The call control unit 12 sends the ACK message to the IP phone A (see process (11)), and sends the connection failure notification to the SIP server B (see process (12)).

Figure 30:
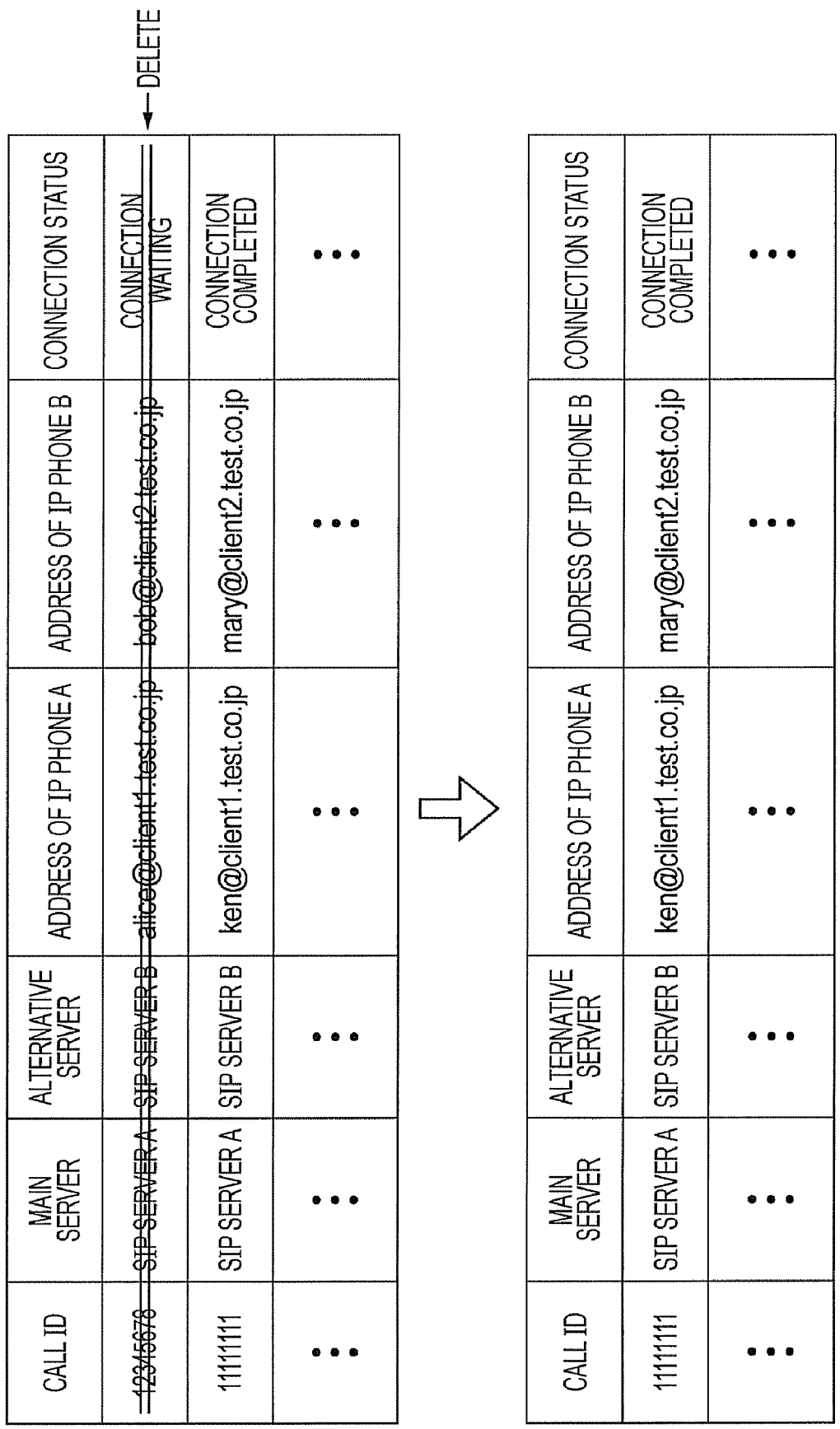
FIG. 30 is a schematic diagram representing how an unnecessary record is deleted in the connection-status table.

Upon receipt of the connection failure notification, the call control unit 12 of the SIP server B deletes the related record in the connection-status table. The call control unit 12 of the SIP server B searches call control sessions controlled by the SIP server A for a call control session for which no media session has been established, and deletes the found record. Specifically, in response to the connection failure notification, the call control unit 12 of the SIP server B searches for a record in which the SIP server B and the SIP server A are set as the alternative server and the main server, respectively, and in which the connection status is set to the connection waiting state, and deletes the found record. Therefore, an unnecessary record is deleted to reduce extra resource consumption. Note that although an error has occurred in the IP phone A, the SIP server A can continue the call control session. FIG. 30 is a schematic diagram representing how an unnecessary record is deleted in the connection-status table.

(3) Processing Flow

Figure 31:
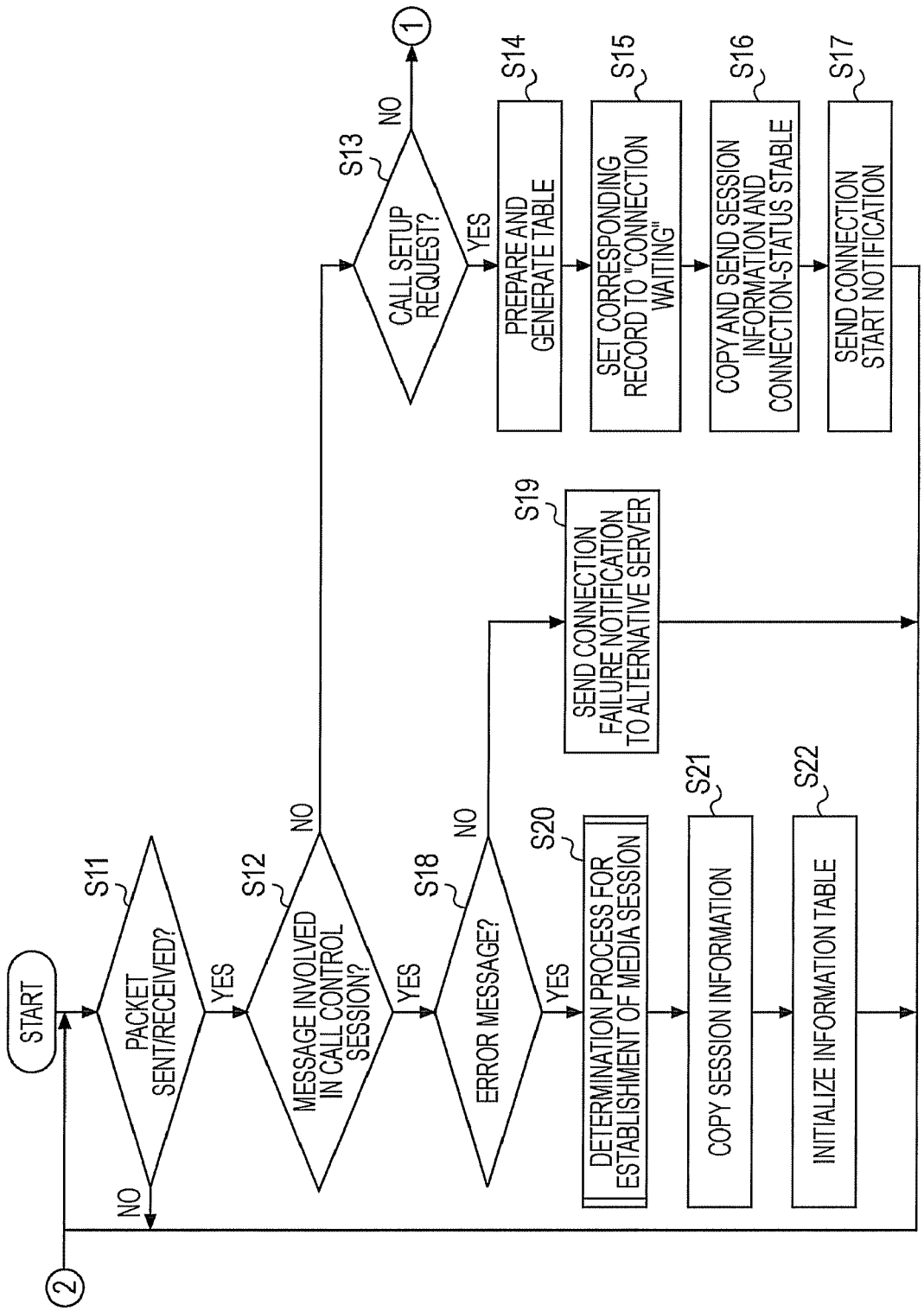
FIG. 31 is a flowchart representing an overall flow of a method for copying session information at a SIP server according to the second embodiment.
Figure 32:
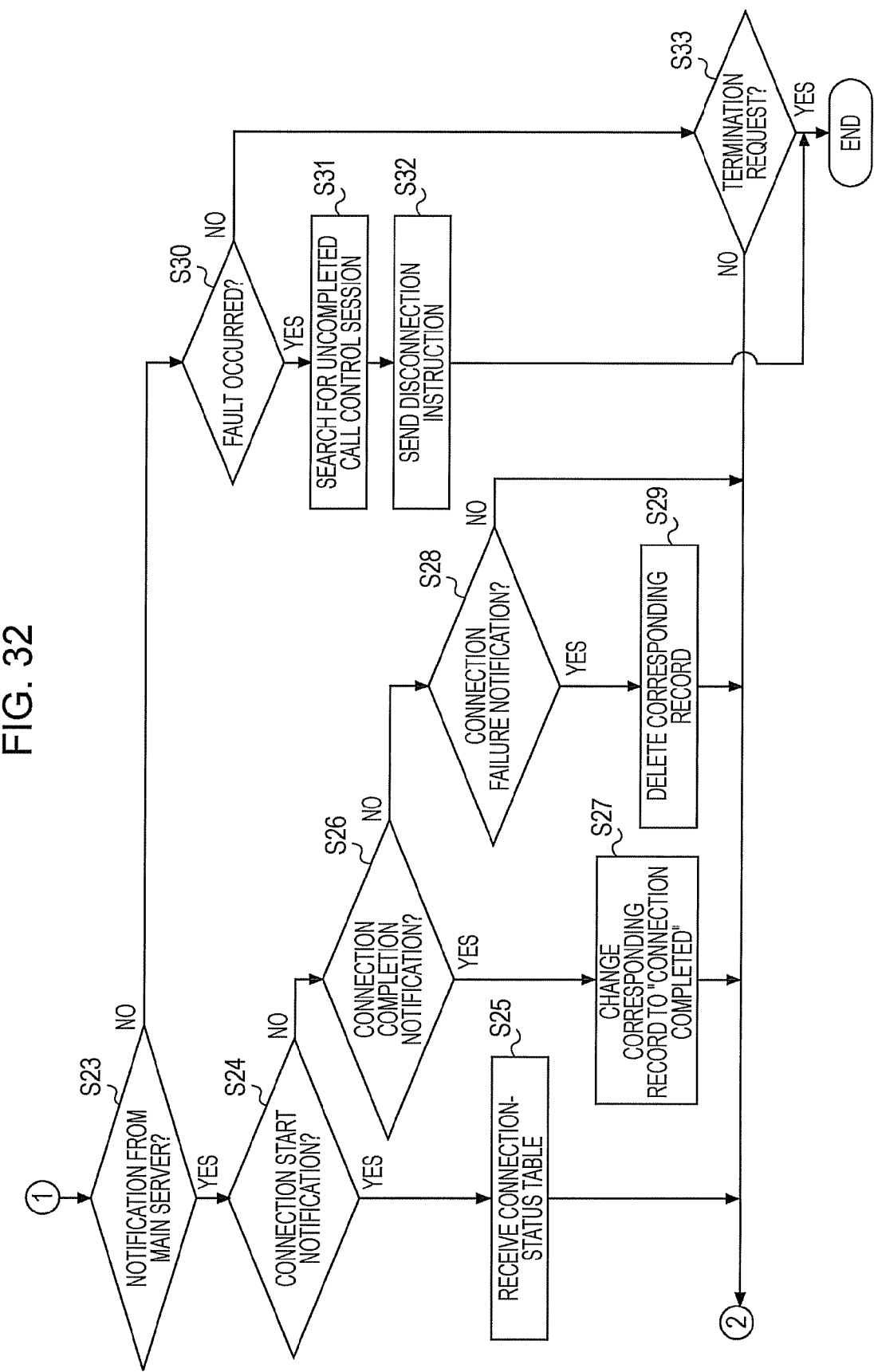
FIG. 32 is a flowchart representing an overall flow of the method for copying session information at a SIP server according to the second embodiment.

Next, a processing flow of a method for copying session information at the SIP servers will be described with reference to FIGS. 31 and 32. FIGS. 31 and 32 are flowcharts representing an example of an overall flow of a method for copying session information at the SIP servers according to the second embodiment. FIG. 31 illustrates a processing flow at the SIP server A serving as a main server, and FIG. 32 illustrates a processing flow at the SIP server B serving as an alternative server.

(3-1) First, a processing flow at the SIP server A serving as a main server will be described with reference to FIG. 31.

Operation S11: When the sending/receiving unit 11 of the SIP server A sends or receives a packet, the method proceeds to operation S2. If no packet has been sent or received, the method waits.

Operation S12: Upon receipt of an HTTP request based on the GET method serving as an origination request, the call control unit 12 sets a call ID and a SIP session ID, and generates a call setup request including the IDs, session information, and a connection start notification. The session information DB 21 stores the session information. Upon receipt of a media session disconnection request from an IP phone, on the other hand, the call control unit 12 generates a termination request.

The call control unit 12 sends a message involved in the call control session and the call setup request to the monitoring unit 13 and the table generation unit 14. When the monitoring unit 13 receives the message, the method proceeds to operation S18. When the table generation unit 14 receives a call setup request or when the call control unit 12 generates a termination request, the method proceeds to operation S13.

Operations S13 to S15: Upon receipt of a call setup request from the call control unit 12, the table generation unit 14 prepares the information table 22, and generates a connection-status table in which the call ID, the main server, the alternative server, and the addresses of the IP phones are set (operations S13 and S14). Further, in response to the connection start notification from the call control unit 12, the table generation unit 14 sets the connection status of the corresponding call ID to a connection waiting state (operation S15).

Operation S16: Prior to the establishment of a media session, the copying processing unit 16 copies the session information and the connection-status table, and sends the copied session information and connection-status table.

Operation S17: The sending/receiving unit 11 sends the connection start notification generated by the call control unit 12 to the SIP server B serving as an alternative server.

Operations S18 and S19: The call control unit 12 determines whether or not the received message is an error message. If the received message is an error message, the call control unit 12 generates a connection failure notification and sends it to the SIP server B serving as an alternative server. If the received message is not an error message, the method proceeds to operation S20.

Operations S20 to S22: A determination process for the establishment of a media session is performed (operation S20). In a case where a media session has been established, a connection completion notification is generated and the session information is copied and sent to the SIP server B (operation S21). Thereafter, the information table 22 is initialized (operation S22).

(3-2) Next, a processing flow at the SIP server B serving as an alternative server will be described with reference to FIG. 32.

Operation S23: The call control unit 12 determines whether or not the received packet includes a notification from the SIP server A serving as a main server. If the packet includes a notification from the main server, the method proceeds to operation S24. Otherwise, the method proceeds to operation S30.

Operations S24 and S25: If the notification is a connection start notification, the call control unit 12 receives a connection-status table from the SIP server A.

Operations S26 and S27: If the notification is a connection completion notification, the call control unit 12 changes the connection status of the corresponding record in the connection-status table from the connection waiting state to the connection completed state.

Operations S28 and S29: If the notification is a connection failure notification, the call control unit 12 deletes the corresponding record in the connection-status table. Therefore, extra resource consumption can be reduced.

Operation S30: The call control unit 12 receives a response packet to the confirmation packet, and determines whether or not a fault has occurred in the SIP server A serving as a main node. If a fault has occurred in the main node, the method proceeds to operation S31. Otherwise, the process proceeds to operation S33.

Operation S31: The call control unit 12 searches for a call control session for which no media session has been established from among call control sessions controlled by the SIP server A in the connection-status table.

Operation S32: The call control unit 12 of the SIP server B sends a BYE message to the IP phones A and B associated with the found record, and terminates the call control session performed by the SIP server A.

Operation S33: If the received packet represents a disconnection request, the call control unit 12 sends a termination request such as a BYE message to the IP phones A and B to terminate the call control session performed by the SIP server B. Otherwise, the method returns to operation S1.

(4) Modifications

In the foregoing embodiment, in a case where a fault has occurred in a call control session that is set to the connection waiting state, it is only required to release the call control session. Thus, it is only required to recognize a call control session that is set to the connection waiting state among call control sessions controlled by the main server. In a connection-status table, therefore, it is only required that at least one of the call ID and the identifier of the main server be associated with the connection status.

Further, the timing at which session information and a connection-status table are generated and sent to the SIP server B prior to the establishment of a media session is not limited to the timing described above. For example, session information and a connection-status table may be generated and sent to the SIP server B at any time after an HTTP request based on the GET method has been received at the SIP server A and before a media session has been established. Preferably, session information and a connection-status table are generated and sent to the SIP server B when the SIP server A receives an HTTP request. Therefore, even in a case where a fault has occurred at the beginning of a call control session, an alternative server can take over the call control session from the main server.

In the foregoing embodiment, the SIP server A generates and copies a connection-status table, and sends the copied connection-status table to the SIP server B. Alternatively, the SIP server B may generate a connection-status table. For example, the copying processing unit 15 of the SIP server A temporarily copies session information and sends it to the SIP server B at any time before the establishment of a media session. Further, the call control unit 12 of the SIP server A sends a notification indicating that the SIP server A is ready for connection to establish a media session to the SIP server B. The table generation unit 14 of the SIP server B generates a connection-status table based on the session information and the notification.

In the foregoing embodiment, upon receipt of a connection completion notification from the SIP server A, the SIP server B changes the connection status of the connection-status table to the connection completed state. Alternatively, the SIP server B may receive a connection-status table from the SIP server A in which the connection status has already been changed to the connection completed state. Session information and a connection-status table may be integrally formed. For example, session information may include the connection status.

As in the first embodiment, the SIP server B may maintain a session association table. The timing at which a session association table is sent from the SIP server A to the SIP server B is not specifically limited. For example, a session association table may be sent from the SIP server A to the SIP server B at the same time as the timing at which session information is temporarily copied and sent prior to the establishment of a media session. Alternatively, a session association table may be generated and sent before session information is copied and sent.

<Other Embodiments>

While the foregoing embodiments have been described in the context of a service in which a call originates from a browser terminal, the present invention may also be applied to calls originating directly from an IP phone. In this case, first, the IP phone A sends an INVITE message to the SIP server A. The SIP server A forwards the INVITE message received from the IP phone A to the IP phone B. Further, the IP phones A and B send and receive a 200 OK message and an ACK message via the SIP server A, and a media session is established.

While in the foregoing embodiments, the processes of the present invention are performed by the functional units depicted in FIG. 3 or 21, the processes of the present invention may be performed by the entirety of the functional units and the structure of an entity of the functional units that performs each process is not limited to that depicted in FIG. 3 or 21. While only two SIP servers are described in the foregoing embodiments, more than two SIP servers may be connected to the network 1 and may form a cluster.

Further, an HTTP request may be sent using the POST method instead of using the GET method. While a fault is detected by sending a confirmation packet, a fault may be detected using any other method. Moreover, a system that executes the method for copying session information described above, a computer program that causes a computer to execute the method for copying session information described above, and a computer-readable recording medium having the program recorded thereon may fall within the scope of the present invention. Examples of the computer-readable recording medium include a flexible disk, a hard disk, a compact disc-read only memory (CD-ROM), a magneto-optical (MO) disk, a digital video disc (DVD), a DVD-ROM, a DVD-RAM, a Blue-ray Disc (BD), and a semiconductor memory. The computer program is not limited to that recorded on the recording medium described above, and may be sent via a telecommunications line, a wireless or wired communication line, a network such as the Internet, or any other suitable medium.

What is claimed is:

1. A method for copying session information, the method being executed by a call control server that establishes a media session for sending and receiving media data between a calling terminal and a called terminal based on a call setup request by the calling terminal, the method comprising:

a sending and receiving operation of sending and receiving messages to and from the calling terminal and the called terminal in a call control session for establishing the media session;

a session information generating operation of generating session information that is required for executing the call control session;

a table generation operation of receiving the call setup request and preparing an information table, the information table setting a call ID, terminal names, and a session ID that are included in the call setup request;

a storing operation of storing, in the information table, media information for determining the establishment of the media session based on the sent and received messages involved in the call control session;

a monitoring operation of monitoring the media information that defines a method of sending and receiving the media data, the media information being included in the messages;

a copying determining operation of determining whether or not the media session has been established according to a monitoring result; and a copying processing operation of automatically copying the session information and sending the copied session information to at least one other call control server different from the call control server when it is determined that the media session has been established, wherein the copying determining operation determines that the media session has been established when the monitoring operation detects that a sending destination address received from the calling terminal has been sent to the called terminal and detects that a sending destination address received from the called terminal has been sent to the calling terminal.

2. The method for copying session information according to claim 1, wherein the copying determining operation determines that the media session has been established when the monitoring operation detects that media information received from the calling terminal has been sent to the called terminal and detects that media information received from the called terminal has been sent to the calling terminal.

3. The method for copying session information according to claim 2, wherein the media information includes a sending destination address to which a recipient of each of the messages is to send the media data.

4. The method for copying session information according to claim 3, wherein the media information further includes a sending destination port number to which a recipient of each of the messages is to send the media data, and wherein the copying determining operation determines that the media session has been established when the monitoring operation further detects that a sending destination port number received from the calling terminal has been sent to the called terminal and detects that a sending destination port number received from the called terminal has been sent to the calling terminal.

5. The method for copying session information according to claim 3, further comprising:

a specific address storing operation of storing a plurality of specific addresses in association with a service server that provides a specific service; and a sending destination address assigning operation of, in the call control session, assigning a first specific address of the plurality of specific addresses as a sending destination address to which the calling terminal is to send the media data and assigning a second specific address, different from the first specific address, of the plurality of specific addresses as a sending destination address to which the called terminal is to send the media data, wherein the copying determining operation determines that the media session has been established when the monitoring operation detects that a sending media destination address in a media description of the call setup message that is sent to the calling terminal is the first specific address and detects that a sending media destination address in the media description of the call setup message that is sent to the called terminal is the second specific address.

6. The method for copying session information according to claim 3, wherein the copying determining operation determines that the media session has been established when messages for acknowledging that the media data has been sent to the sending destination addresses are further received from the calling terminal and the called terminal.

7. The method for copying session information according to claim 1, further comprising a session information receiving operation of receiving session information that is required for the at least one other call control server to execute a call control session at a time point after the at least one other call control server has started a call control session and before a media session controlled by the call control session has been established.

8. The method for copying session information according to claim 7, wherein the session information receiving operation receives the session information from the at least one other call control server at a start of a call control session performed by the at least one other call control server.

9. The method for copying session information according to claim 7, further comprising:
 a fault detecting operation of detecting a fault that has occurred in the at least one other call control server; and
 a termination request sending operation of, when the fault is detected, sending a termination request for terminating the call control session performed by the at least one other call control server in accordance with the session information.

10. The method for copying session information according to claim 7, further comprising a status storing operation of storing a status of the call control session performed by the at least one other call control server.

11. The method for copying session information according to claim 10, further comprising:
 a connection failure notification receiving operation of receiving a connection failure notification from the at least one other call control server, the connection failure notification indicating that the media session controlled by the call control session performed by the at least one other call control server is not successfully established; and
 a deleting operation of deleting the status of the call control session performed by the at least one other call control server in response to the received connection failure notification, the status being stored in the state storage operation.

12. The method for copying session information according to claim 1, wherein the call control session is based on Session Initiation Protocol, and
 the monitoring operation monitors the media information in the messages sent and received in the call control session, the media information being described using Session Description Protocol.

13. The method for copying session information according to claim 11, further comprising an association storing operation of storing an association between an identifier of a hypertext-transfer-protocol session based on Hypertext Transfer Protocol for requesting a second other call control server different from the at least one other call control server to start a media session and an identifier of a call control session performed by the second other call control server, the call control session being started by the hypertext-transfer-protocol session, the association being received from the second other call control server.

14. A call control server that establishes a media session for sending and receiving media data between a calling terminal and a called terminal based on a call setup request by the calling terminal, the call control server comprising:
 a processor configured to send and receive messages to and from the calling terminal and the called terminal in a call control session for establishing the media session;
 a session information generating unit generating session information that is required for executing the call control session;
 a table generation unit configured to receive the call setup request and prepare information setting a call ID, terminal names, and a session ID that are included in the call setup request;
 an information table configured to store that information prepared by the table generation unit and media information for determining the establishment of the media session based on the sent and received messages involved in the call control session;
 a monitoring unit monitoring the media information that defines a method of sending and receiving the media data, the media information being included in the messages;
 a copying determination unit determining whether or not the media session has been established according to a monitoring result; and
 a copying processing unit automatically copying the session information and sending the copied session information to at least one other call control server different from the call control server when it is determined that the media session has been established,
 wherein the copying determining unit determines that the media session has been established when the monitoring unit detects that a sending destination address received from the calling terminal has been sent to the called terminal and detects that a sending destination address received from the called terminal has been sent to the calling terminal.

15. A non-transitory computer-readable recording medium that stores a program for copying session information, the program being executed by a computer that establishes a media session for sending and receiving media data between a calling terminal and a called terminal, the program causing the computer to execute:
 a sending and receiving operation of sending and receiving messages to and from the calling terminal and the called terminal in a call control session for establishing the media session;
 a session information generating operation of generating session information that is required for executing the call control session;
 a table generation operation of receiving the call setup request and preparing an information table, the information table setting a call ID, terminal names, and a session ID that are included in the call setup request;
 a storing operation of storing, in the information table, media information for determining the establishment of the media session based on the sent and received messages involved in the call control session;
 a monitoring operation of monitoring the media information that defines a method of sending and receiving the media data, the media information being included in the messages;

a copying determining operation of determining whether or not the media session has been established according to a monitoring result; and a copying processing operation of automatically copying the session information and sending the copied session information to at least one other call control server different from the computer when it is determined that the media session has been established, wherein the copying determining operation determines that the media session has been established when the monitoring operation detects that a sending destination address received from the calling terminal has been sent to the called terminal and detects that a sending destination address received from the called terminal has been sent to the calling terminal.

16. The method for copying session information according to claim 1, wherein the copying determining operation determines whether or not a valid media destination address was exchanged in call setup messages between terminals according to a monitoring result.

* * * * *